US012661885B2

(12) United States Patent
Ishida et al.

(10) Patent No.: US 12,661,885 B2
(45) Date of Patent: Jun. 23, 2026

(54) LIQUID EJECTION HEAD

(71) Applicant: CANON KABUSHIKI KAISHA, Tokyo (JP)

(72) Inventors: Koichi Ishida, Tokyo (JP); Shuzo Iwanaga, Kanagawa (JP); Hiroaki Mihara, Tokyo (JP); Satoshi Kimura, Kanagawa (JP); Tomohiro Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 18/640,654

(22) Filed: Apr. 19, 2024

(65) Prior Publication Data

US 2024/0351331 A1 Oct. 24, 2024

(30) Foreign Application Priority Data

Apr. 20, 2023 (JP) ................................ 2023-069132

(51) Int. Cl.
*B41J 2/14* (2006.01)
*B41J 2/21* (2006.01)

(52) U.S. Cl.
CPC ......... *B41J 2/14024* (2013.01); *B41J 2/1433* (2013.01); *B41J 2/2103* (2013.01); *B41J 2002/14411* (2013.01)

(58) Field of Classification Search
CPC .... B41J 2/14024; B41J 2/1433; B41J 2/2103; B41J 2/165; B41J 2002/14411; G03G 21/1619; G03G 2221/165; G03G 15/346
See application file for complete search history.

(56) References Cited

U.S. PATENT DOCUMENTS

| | | | | |
|---|---|---|---|---|
| 10,442,203 | B2 | 10/2019 | Nakakubo et al. | |
| 2006/0164467 | A1* | 7/2006 | Shibuya | B41J 2/1433 347/70 |
| 2019/0143681 | A1* | 5/2019 | Tomita | B41J 2/14209 347/50 |
| 2022/0339935 | A1 | 10/2022 | Kimura et al. | |
| 2024/0217233 | A1 | 7/2024 | Mori et al. | |
| 2024/0217236 | A1 | 7/2024 | Osaki et al. | |

FOREIGN PATENT DOCUMENTS

| | | | |
|---|---|---|---|
| JP | 04-234665 A | | 8/1992 |
| JP | 2006-334910 A | | 12/2006 |
| JP | 2009214303 A | * | 9/2009 |

* cited by examiner

*Primary Examiner* — Jason S Uhlenhake
(74) *Attorney, Agent, or Firm* — Venable LLP

(57) ABSTRACT

A liquid ejection head includes a print element substrate having an ejection port forming member including an ejection surface on which a plurality of ejection port arrays for ejecting liquid are formed and a protection member having an opening corresponding to one of the ejection port arrays, the protection member is provided with at least one recessed portion at an end parallel to a direction of the plurality of ejection port arrays in a direction orthogonal to the plurality of ejection port arrays and a projection portion projecting in the direction orthogonal to the plurality of ejection port arrays, the projection portion is provided inside the at least one recessed portion, and the ejection port forming member has a corresponding recessed portion corresponding to the projection portion in the direction orthogonal to the plurality of ejection port arrays.

16 Claims, 21 Drawing Sheets

LIQUID EJECTION HEAD

BACKGROUND OF THE INVENTION

Field of the Invention

The present disclosure relates to a liquid ejection head.

Description of the Related Art

A line type head in which a plurality of print element substrates are arrayed and which corresponds to the width of a print medium is used to perform continuous printing in one pass while conveying a plurality of print media continuously or intermittently. At that time, a problem may arise in that the print medium being conveyed floats up and contacts a print element substrate, thereby damaging a liquid ejection head. Japanese Patent Laid-Open No. 2006-334910 (referred to as Literature 1) and Japanese Patent Laid-Open No. H04-234665 (1992) (referred to as Literature 2) disclose that a protection member made of resin or metal is adhered to an ejection surface on which an ejection port is formed.

Incidentally, in the process of manufacturing a protection member, a plurality of protection members are connected and formed in one sheet, and one protection member is formed by separating this connection. This separation may cause the protection member to have a projection portion. In this case, there is a fear that in a protection member as that disclosed in Literatures 1 and 2, the projection portion of the protection member may be deformed toward an ejection surface side and the protection member may be attached in the state of floating up and peeled off in a case where a print medium contacts a print element substrate by floating up.

Thus, in view of the above problem, the present disclosure aims to provide a liquid ejection head that suppresses peeling due to floating up of a protection member.

SUMMARY OF THE INVENTION

A liquid ejection head according to the present disclosure is a liquid ejection head including a print element substrate having an ejection port forming member including an ejection surface on which a plurality of ejection port arrays for ejecting liquid are formed and a protection member having an opening corresponding to one of the ejection port arrays, wherein the protection member is provided with at least one recessed portion at an end parallel to the direction of the plurality of ejection port arrays in a direction orthogonal to the plurality of ejection port arrays and with a projection portion projecting in the direction orthogonal to the plurality of ejection port arrays, wherein the projection portion is provided inside the at least one recessed portion, and wherein the ejection port forming member has a corresponding recessed portion corresponding to the projection portion in the direction orthogonal to the plurality of ejection port arrays.

Further features of the present invention will become apparent from the following description of exemplary embodiments with reference to the attached drawings.

DESCRIPTION OF THE EMBODIMENTS

Examples of embodiments of the present disclosure will be described below with reference to the drawings. However, the following description does not limit the scope of the present disclosure. As an example, a thermal system in which a heating element generates air bubbles to eject liquid is used in the present embodiment. However, the present disclosure may also be applied to a liquid ejection head that uses a piezoelectric system or another one of the various other liquid ejection systems.

The present embodiment is an inkjet printing apparatus (printing apparatus) in which liquid such as ink is circulated between a tank and a liquid ejection head, but may be in another form. For example, the present embodiment may be in a form in which two tanks are provided on the upstream side and downstream side of the liquid ejection head to flow ink within a pressure chamber by flowing ink from one tank to the other tank instead of circulating the ink.

Further, the present embodiment is a so-called line type head having a length corresponding to the width of a print medium. However, the present disclosure is also applicable to a so-called serial type liquid ejection head that performs printing while scanning a print medium. Examples of the serial type liquid ejection head include one in which one print element substrate for black ink and one print element substrate for chromatic color ink are mounted. It should be noted that the liquid ejection head according to the present disclosure is not limited to this, and a short line head which is formed by arranging several print element substrates so as to cause ejection ports to overlap in an ejection port array direction may be formed, the short line head being shorter than the width of the print medium and being used to scan a print medium.

Description of the Basic Configuration of the Present Disclosure

Description of the Inkjet Printing Apparatus

Figure 1:
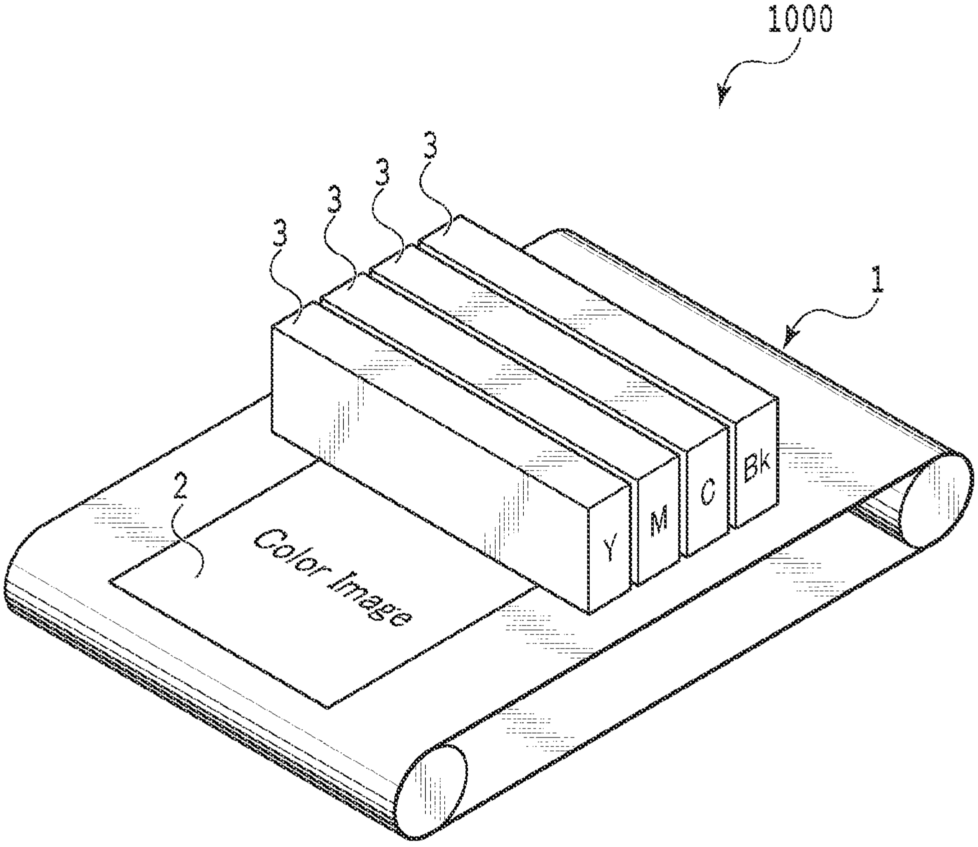
FIG. 1 is a schematic configuration diagram of a printing apparatus according to the present disclosure.

FIG. 1 is a schematic configuration diagram of an apparatus for ejecting liquid according to the present disclosure, specifically, an inkjet printing apparatus 1000 (hereinafter also referred to as printing apparatus) that ejects ink to perform printing. The printing apparatus 1000 according to the present embodiment includes a conveying portion 1 that conveys a print medium 2 and a line-type liquid ejection head 3 arranged substantially orthogonal to a conveyance direction in which the print medium 2 is conveyed. The liquid ejection head 3 ejects cyan (C), magenta (M), yellow (Y), and black (Bk) inks, so that a color image can be printed on the print medium 2. In the figure, an X direction is the conveyance direction of the print medium 2, a Y direction is the width direction of the print medium, and a Z direction is a vertically upward direction.

The print medium 2 is mounted on the conveying portion 1 and is conveyed in the X direction at a predetermined speed below the four print heads 3 that eject different inks. In FIG. 1, the four print heads 3 are arranged in the X direction in the order of cyan, magenta, yellow, and black, and ink is ejected onto the print medium 2 in this order. In each print head 3, a plurality of ejection ports for ejecting ink are arrayed in the Y direction.

Although cut paper is shown as the print medium 2 in FIG. 1, the print medium 2 may be continuous paper supplied from roll paper. Further, the print medium is not limited to paper, but may also be a film or the like.

Figure 2:
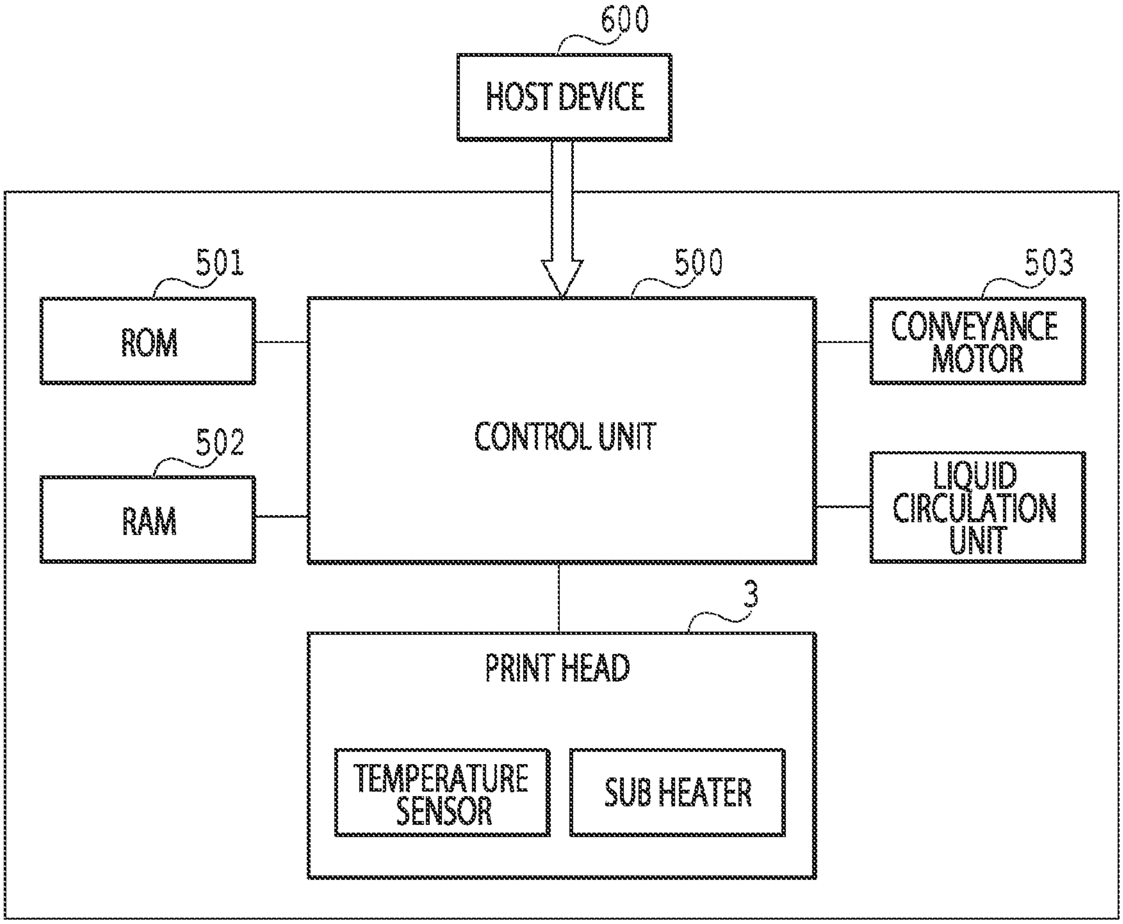
FIG. 2 is a conceptual diagram of a control system according to the present disclosure.

FIG. 2 is a block diagram for explaining a control configuration in the printing apparatus 1000. A control unit 500 is formed of a CPU and the like and controls the entire printing apparatus 1000 while using a RAM 502 as a work area in accordance with a program and various parameters stored in a ROM 501. The control unit 500 performs predetermined image processing on image data received from a host device 600 connected to the outside in accordance with the program and parameters stored in the ROM 501 and generates ejection data that can be ejected by the print head 3. The print head 3 is then driven in accordance with the ejection data to eject ink at a predetermined frequency.

During the ejection operation by the print head 3, the control unit 500 drives a conveyance motor 503 to convey the print medium 2 in the X direction at a speed corresponding to a drive frequency. As a result, an image according to the image data received from the host device 600 is printed on the print medium. Information on a used area for the ejection ports used for ejection in the print head 3 is stored in the ROM 501 in a rewritable manner for each print head 3. A method of setting the used area will be described in detail later.

Description of an Ink Circulation Path

Figure 3:
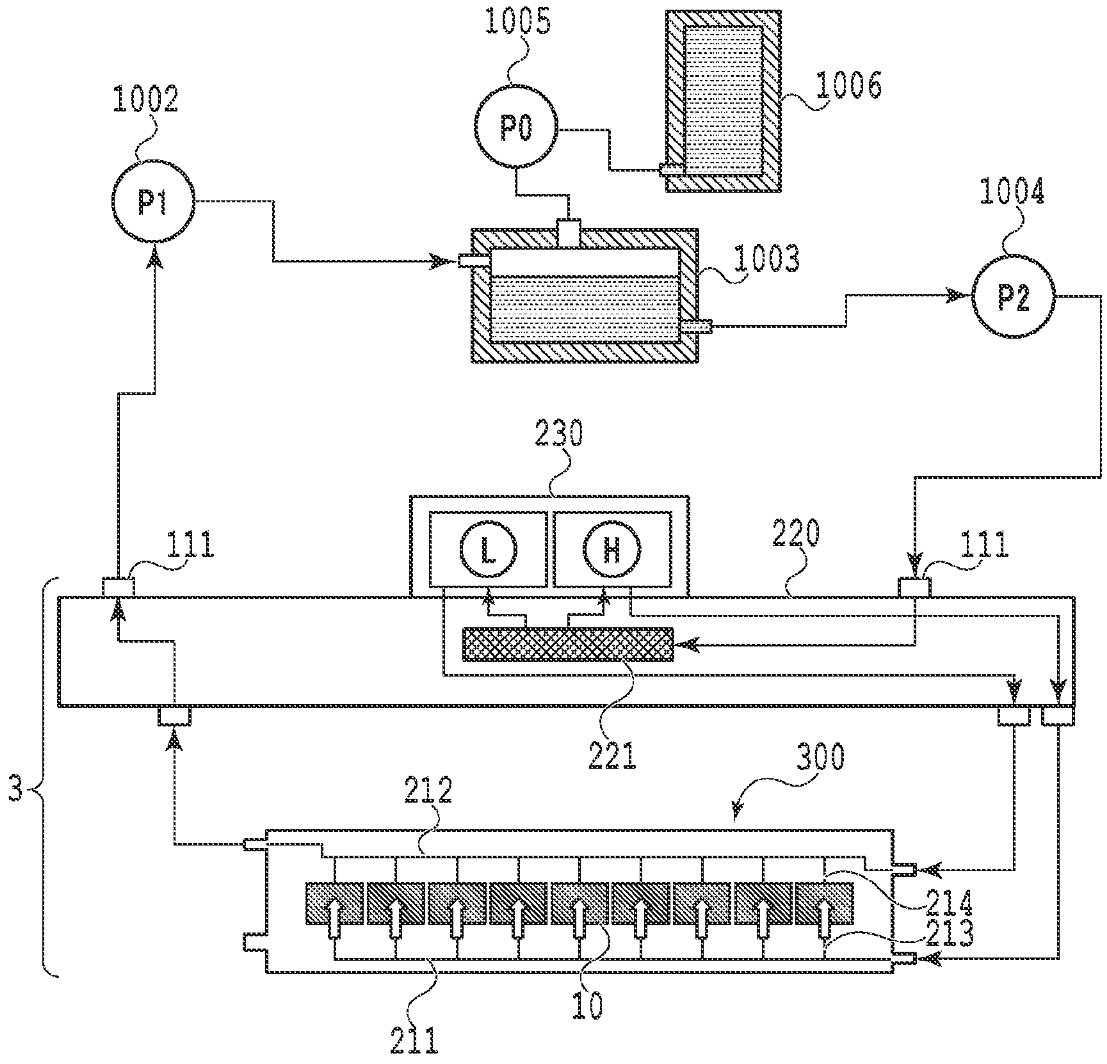
FIG. 3 is a schematic diagram of a liquid circulation path in the printing apparatus according to the present disclosure.

FIG. 3 is a schematic diagram showing a circulation path applied to the printing apparatus according to the present embodiment and is a diagram in which the liquid ejection head 3 is fluidly connected to a first circulation pump 1002, a buffer tank 1003, and the like. Although FIG. 3 shows only a path through which ink of one color of CMYK inks flows to simplify description, a circulation path compatible with a plurality of colors is actually provided in the liquid ejection head 3 and the printing apparatus 1000. A buffer tank 1003 as a sub tank connected to a main tank 1006 includes an atmosphere communication port (not shown) that establishes communication between the inside and outside of the tank and can discharge air bubbles in ink to the outside. The buffer tank 1003 is also connected to a replenishment pump 1005. In a case where liquid is consumed with the liquid ejection head 3 by ejecting (discharging) ink from the ejection ports of the liquid ejection head, such as printing by ejecting ink or suction recovery, the replenishment pump 1005 transfers the consumed ink from the main tank 1006 to the buffer tank 1003.

The first circulation pump 1002 has a role in drawing out liquid from a liquid connection portion 111 of the liquid ejection head 3 and flowing the liquid to the buffer tank 1003. As the first circulation pump 1002, a displacement pump having a quantitative liquid feeding ability is preferable. Specific examples include a tube pump, gear pump, diaphragm pump, syringe pump, and the like. However, an embodiment in which a general constant flow valve or relief valve is arranged at a pump outlet to ensure a constant flow rate may also be used. While the liquid ejection head 3 is being driven, a certain amount of ink flows through a common collecting channel 212 by the first circulation pump 1002. It is preferable to set this flow rate to a level or more at which a temperature difference between the print element substrates 10 in the liquid ejection head 3 does not affect print image quality. However, in a case where too a high flow rate is set, a negative pressure difference becomes too large between the print element substrates 10 due to the effect of pressure loss in a channel within the liquid ejection unit 300, resulting in density unevenness in an image. Thus, it is preferable to set the flow rate in consideration of differences in temperature and negative pressure between the print element substrates 10.

A negative pressure control unit 230 is provided in a path between a second circulation pump 1004 and the liquid ejection unit 300. Thus, the negative pressure control unit 230 has the function of operating to maintain a pressure downstream of the negative pressure control unit 230 (on the liquid ejection unit 300 side) at a preset constant pressure even in a case where the flow rate of a circulation system fluctuates due to a difference in printing duty. As two pressure adjustment mechanisms that form the negative pressure control unit 230, any mechanism that can control a pressure downstream of the mechanism itself within a certain range of fluctuations around a desired set pressure may also be used. As an example, a mechanism similar to a so-called "pressure-reducing regulator" can be used. In the case of using the pressure-reducing regulator, as shown in FIG. 3, it is preferable that the second circulation pump 1004 pressurize the upstream side of the negative pressure control unit 230 via a liquid supply unit 220. This can suppress the effect of a water head pressure of the buffer tank 1003 on the liquid ejection head 3, so that the degree of freedom in the layout of the buffer tank 1003 in the printing apparatus 1000 can be increased. It is only required that the second circulation pump 1004 have a certain head pressure or more within the range of ink circulation flow rates used at the time of driving the liquid ejection head 3, and a turbo type pump, a displacement pump, or the like can be used. Specifically, a diaphragm pump or the like is applicable. Further, instead of the second circulation pump 1004, for example, a water head tank arranged with a certain water head difference with respect to the negative pressure control unit 230 is also applicable.

As shown in FIG. 3, the negative pressure control unit 230 includes the two pressure adjustment mechanisms for which different control pressures are set. Of the two negative pressure adjustment mechanisms, one for which a relatively high pressure is set (denoted as H in FIG. 3) and the other for which a relatively low pressure is set (denoted as L in FIG. 3) are connected to a common supply channel 211 and a common collecting channel 212 in the liquid ejection unit 300, respectively, through the liquid supply unit 220. The liquid ejection unit 300 is provided with the common supply channel 211, the common collecting channel 212, and an individual supply channel 213 and individual collecting channel 214 that communicate with the respective print element substrates. Since the individual channel 213 communicates with the common supply channel 211 and the common collecting channel 212, a portion of liquid flowed using the second circulation pump 1004 passes from the common supply channel 211 through a channel inside the print element substrate 10 and flows into the common collecting channel 212 (arrows in FIG. 3). This is because a pressure difference is provided between the pressure adjustment mechanism H connected to the common supply channel 211 and the pressure adjustment mechanism L connected to the common collecting channel 212, and the first circulation pump 1002 is connected only to the common collecting channel 212.

As described above, in the liquid ejection unit 300, the flow of liquid that passes through the common collecting channel 212 and a flow that passes through each print element substrate 10 from the common supply channel 211 to the common collecting channel 212 are produced. Thus, heat generated in each print element substrate 10 can be discharged to the outside of the print element substrate 10 by flowing from the common supply channel 211 to the common collecting channel 212. In addition, such a configuration makes it possible to cause an ink flow even in an ejection port and a pressure chamber which are not used to perform printing while printing is being performed using the liquid ejection head 3, so that thickening of ink at those sites can be suppressed. Further, thickened ink and foreign matter in ink can be discharged to the common collecting channel 212. Therefore, the liquid ejection head 3 according to the present embodiment enables high-speed and high-quality printing.

Description of a Print Head

Figure 4A:
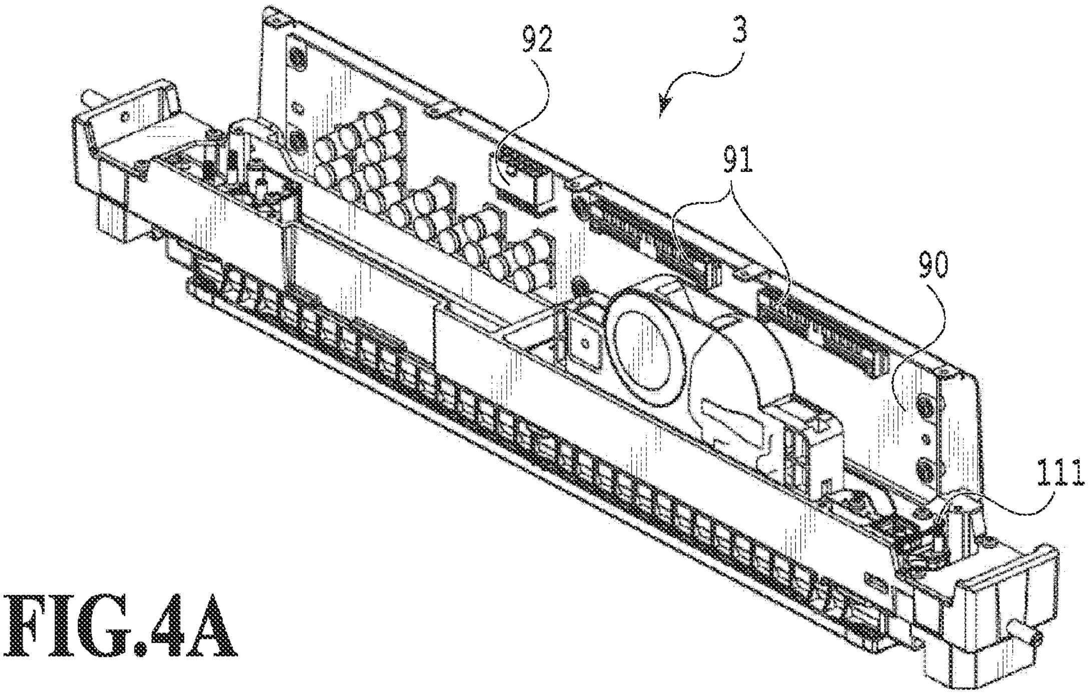
FIGS. 4A and 4B are perspective views of a liquid ejection head according to the present disclosure.
Figure 4B:
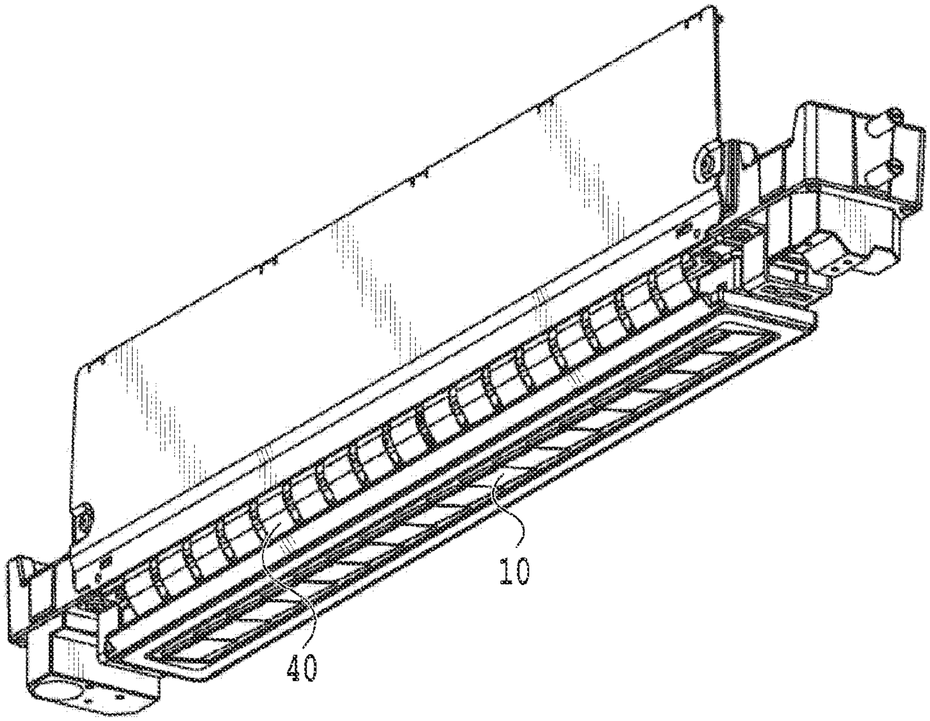

The configuration of the liquid ejection head 3 according to the present embodiment will be described. FIGS. 4A and 4B are perspective views of the liquid ejection head 3 according to the present embodiment. The liquid ejection head 3 is a line type liquid ejection head in which 17 print element substrates 10 capable of ejecting ink are arrayed in a straight line (arranged inline). As shown in FIG. 4A, the liquid ejection head 3 includes the print element substrates 10 and a signal input terminal 91 and a power supply terminal 92 electrically connected to each other via a flexible wiring substrate 40 and an electrical wiring substrate 90. The signal input terminal 91 and the power supply terminal 92 are electrically connected to a control unit of the printing apparatus 1000 and supply an ejection drive signal and power necessary for ejection to each printing element substrate 10, respectively. Gathering wiring using an electric circuit in the electrical wiring substrate 90 can reduce the number of signal output terminals 91 and the number of power supply terminals 92 as compared to the number of print element substrates 10. As a result of this, it is possible to reduce the number of electric connection portions that need to be removed at the time of assembling the liquid ejection head 3 to the printing apparatus 1000 or replacing the liquid ejection head. As shown in FIG. 4A, the liquid connection portion 111 provided on one side of the liquid ejection head 3 is connected to a liquid supply system in the printing apparatus 1000. As a result, ink is supplied from the supply system in the printing apparatus 1000 to the liquid ejection head 3, and ink that has passed through the liquid ejection head 3 is collected to the supply system in the printing apparatus 1000. As described above, ink can be circulated through a path in the printing apparatus 1000 and a path in the liquid ejection head 3.

Figure 5:
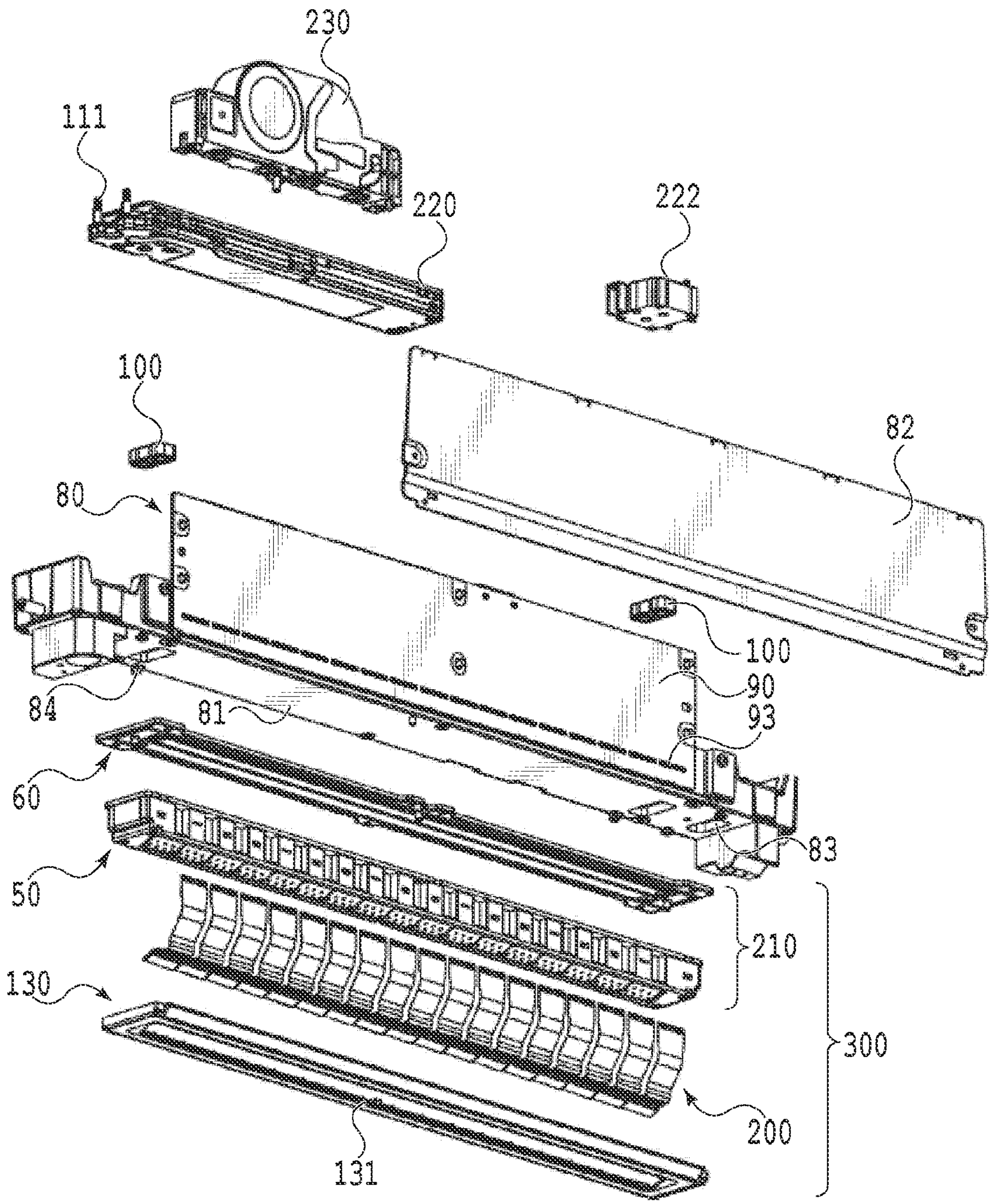
FIG. 5 is an exploded view of the liquid ejection head according to the present disclosure.

Next, the configuration of the liquid ejection head 3 will be specifically described with reference to FIG. 5. FIG. 5 shows an exploded perspective view of each component or unit that forms the liquid ejection head 3. The liquid ejection unit 300, the liquid supply unit 220, and the electrical wiring substrate 90 are attached to a housing 80. The liquid supply unit 220 is provided with a liquid connection portion 111, and in the liquid supply unit 220, there is provided a filter 221 (see FIG. 3) for each color communicating with an opening of the liquid connection portion 111 in order to remove foreign matter from supplied ink. Liquid that has passed through the filter 221 is supplied to the negative pressure control unit 230 arranged on the supply unit 220 so as to correspond to each color. The negative pressure control unit 230 is a unit including a pressure adjustment valve for each color. The negative pressure control unit 230 greatly attenuates a change in pressure loss in the supply system in the printing apparatus 1000 (the supply system on the upstream side of the liquid ejection head 3) generated due to fluctuations in a liquid flow rate through the functions of a valve, spring member, and the like provided therein. As a result, the negative pressure control unit 230 can stabilize a negative pressure change on the downstream side (liquid ejection unit 300 side) of a pressure control unit within a certain range. As shown in FIG. 3, the negative pressure control unit 230 for each color includes two pressure adjustment valves for each color, each of which is set at a different control pressure. Further, the negative pressure control unit 230 set at a high pressure communicates with the common supply channel 211 in the liquid ejection unit 300 and the negative pressure control unit 230 set at a low pressure communicates with the common collecting channel 212, via the liquid supply unit 220.

The housing 80 includes a liquid ejection unit support portion 81 and an electrical wiring substrate support portion 82, supports the liquid ejection unit 300 and the electrical wiring substrate 90, and ensures the rigidity of the liquid ejection head 3. The electrical wiring substrate support portion 82 is for supporting the electrical wiring substrate 90 and is fixed to the liquid ejection unit support portion 81 with screws. The liquid ejection unit support portion 81 has a role in correcting warpage and deformation of the liquid ejection unit 300 to ensure the accuracy in relative positions of the plurality of print element substrates 10, thereby suppressing streaks and unevenness in a printed subject. Further, the liquid ejection unit support portion 81 is provided with openings 83 and 84 into which a joint rubber 100 is inserted. Liquid supplied from the liquid supply unit 220 is guided via a liquid supply joint 222 and the joint rubber 100 to the second channel member 60 that forms the liquid ejection unit 300.

Next, the configuration of the channel member 210 included in the liquid ejection unit 300 will be described. As shown in FIG. 5, the channel member 210 is a stack of a first channel member 50 and a second channel member 60, and a plurality of ejection modules 200 are bonded to the bonding surface of the first channel member 50 with an adhesive (not shown). As a result, the channel is configured such that liquid supplied from the liquid supply unit 220 is distributed to each ejection module 200, and liquid circulating from the ejection module 200 returns to the liquid supply unit 220. The channel member 210 is fixed to the liquid ejection unit support portion 81 with screws.

Figure 6A:
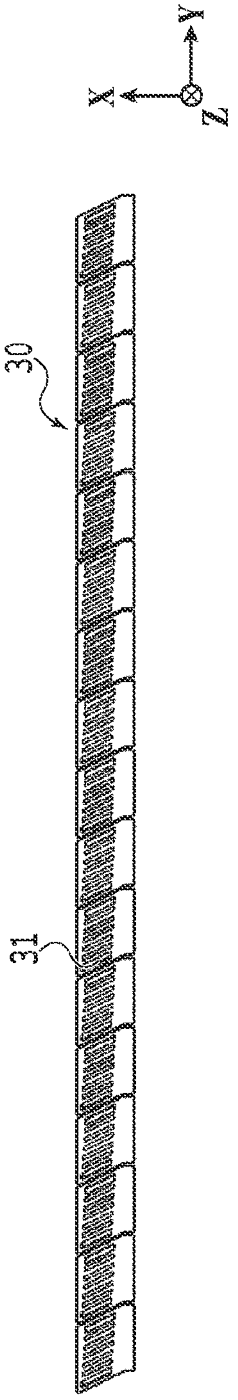
FIGS. 6A to 6D are exploded views of channel members of the liquid ejection head according to the present disclosure.
Figure 6B:
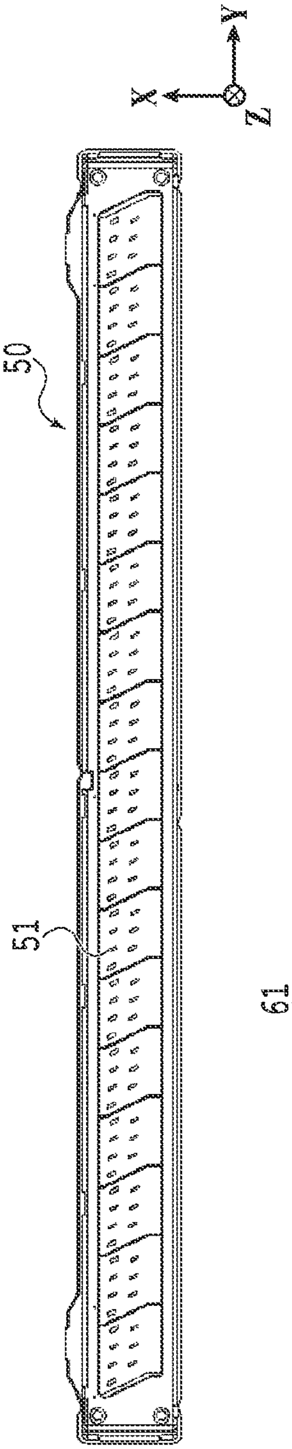
Figure 6C:
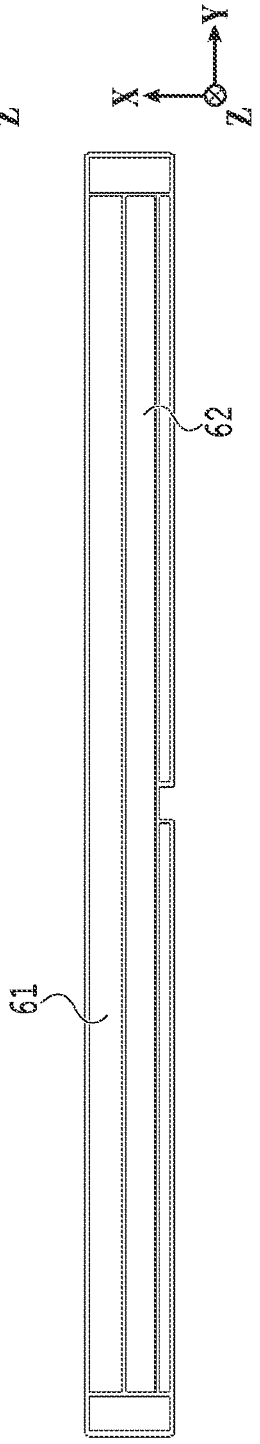
Figure 6D:
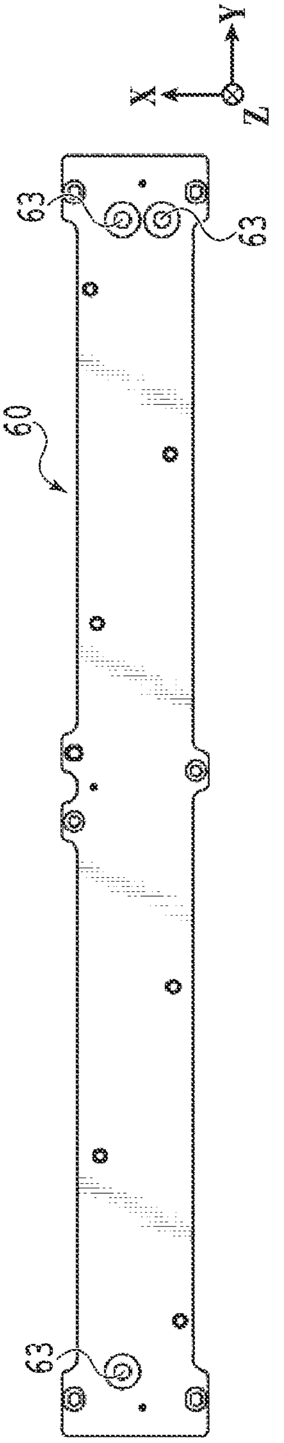

FIGS. 6A to 6D are diagrams for explaining the detailed configuration of the channel member 210. FIG. 6A shows the abutting surface of the support member 30 that abuts the print element substrate 10, and FIG. 6B shows the abutting surface of the first channel member 50 that abuts the support member 30. FIG. 6C shows a cross section of the middle layer of the first channel member, and FIG. 6D shows the surface of the second channel member on the liquid ejection unit support portion 81 side. It should be noted that FIGS. 6A to 6C are views seen from an ejection surface, and FIG. 6D is a view seen from the liquid ejection unit support portion 81 side.

A plurality of the support members 30 are arranged in the first channel member 50, and the print element substrate 10 is arranged in each support member 30. Such a configuration makes it possible to assemble the print heads 3 of various sizes by adjusting the number of arrays with the ejection modules 200. The first channel member 50 and the second channel member 60 are bonded in the order of FIGS. 6A to 6C, and a surface opposite to the surface shown in FIG. 6C and a surface opposite to the surface shown in FIG. 6D are bonded to each other.

As shown in FIG. 6A, on the surface of the support member 30 that abuts the print element substrate 10, a support member communication port 31 is arranged so as to be in fluid communication with the print element substrate 10 and is formed in the individual supply channel 213 and the individual collecting channel 214 (see FIG. 3). The support member communication port 31 is in fluid communication with the common supply channel 211 or the common collecting channel 212 via a communication port 51 formed in the first channel member 50.

As shown in FIG. 6C, common channel grooves 61 and 62 extending in the X direction together with the common supply channel 211 and the common collecting channel 212 (see FIG. 3) are formed in the first channel member 50. As a result, a set of the common supply channel 211 and the common collecting channel 212 is formed in the channel member 210 for each liquid color (see FIGS. 7A and 7B).

As shown in FIG. 6D, a common communication port 63 in fluid communication with the liquid supply unit 220 is formed at opposite ends or one end of the common channel grooves 61 and 62. The communication port 51 is formed at the other end of an individual channel groove 52 of the first channel member 50, and the first channel member 50 fluidly communicates with the plurality of ejection modules 200 via the communication port 51. The individual channel groove 52 makes it possible to gather the channels at the center of the channel member.

Figure 7A:
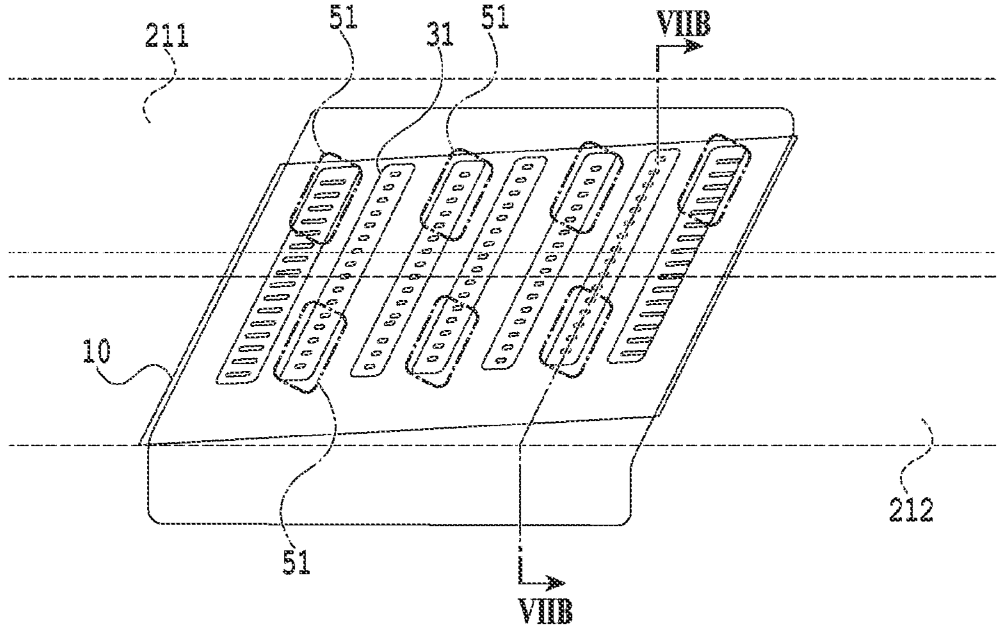
FIGS. 7A and 7B are a partially enlarged perspective view of a channel in a channel member of the liquid ejection head according to the present disclosure as viewed from an ejection module side, and a cross-sectional view taken along line VIIB-VIIB, respectively.
Figure 7B:
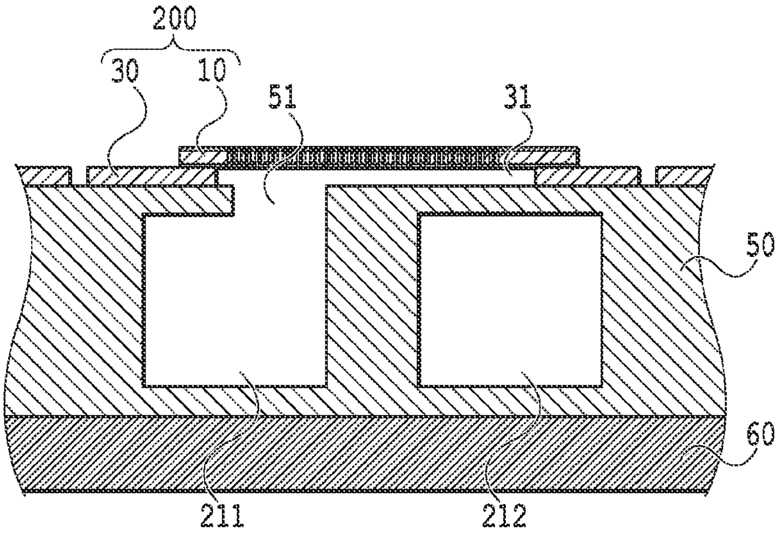

Next, a channel structure in the channel member 210 will be described with reference to FIGS. 7A and 7B. FIG. 7A is an enlarged perspective view of a portion of a channel in the channel member 210 from the side of the first channel member 50 on which the ejection module 200 is mounted. FIG. 7B is a diagram showing a cross section taken along line VIIB-VIIB in FIG. 7A.

The print element substrate 10 of the ejection module 200 is disposed on the communication port 51 of the first channel member 50 via the support member 30. Although the communication port 51 corresponding to the common collecting channel 212 is not shown in FIG. 7B, it is clear from FIG. 7A that the communication port 51 is shown in another cross section.

As already described, the common supply channel 211 is connected to the first negative pressure control unit 230 set at a relatively high pressure, and the common collecting channel 212 is connected to the second negative pressure control unit 230 set at a relatively low pressure. There is formed an ink supply path that passes through the common communication port 63 (see FIGS. 6A to 6D), the common supply channel 211, and the support member communication port 31 and supplies ink to a channel formed in the print element substrate 10. Similarly, there is formed an ink collecting path extending from the channel in the print element substrate 10, and including the support member communication port 31, the communication port 51, the common collecting channel 212, and the common communication port 63 (see FIGS. 7A and 7B). While ink is circulated in this way, an ejection operation according to ejection data is performed in the print element substrate 10, and ink that has not been consumed by the ejection operation among the ink supplied through the ink supply path is collected through the ink collecting path.

Description of the Ejection Module

Figure 8A:
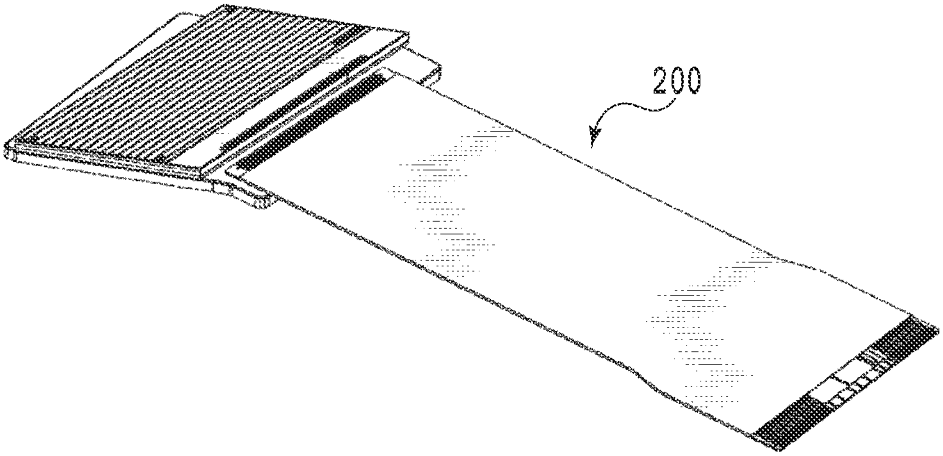
FIGS. 8A and 8B are a perspective view and an exploded view, respectively, of one ejection module of the liquid ejection head according to the present disclosure.
Figure 8B:
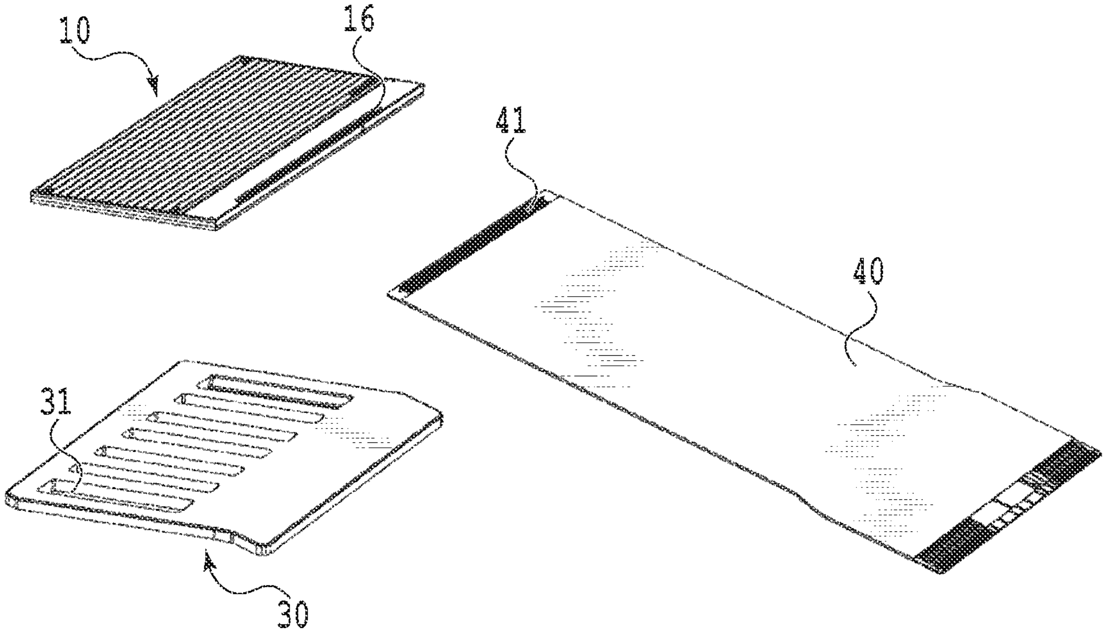

FIG. 8A is a perspective view showing one ejection module 200, and FIG. 8B is an exploded view of the ejection module 200. As a method of manufacturing the ejection module 200, first, the print element substrate 10 and the flexible wiring substrate 40 are adhered onto the support member 30 preprovided with the liquid support member communication port 31. Thereafter, a terminal 16 on the print element substrate 10 and a terminal 41 on the flexible wiring substrate 40 are electrically connected by wire bonding, and a wire bonding portion (electric connection portion) is then covered and sealed with a sealing material. A terminal 42 on the flexible wiring substrate 40 opposite to the print element substrate 10 is electrically connected to a connection terminal 93 (see FIG. 5) on the electrical wiring substrate 90. The support member 30 is a support body that supports the print element substrate 10 and is also a channel member that establishes fluid communication between the print element substrate 10 and the channel member 210, and thus is preferably one which has a high flatness and can be sufficiently highly reliably bonded to a print element substrate. As a material for the support member 30, for example, alumina or a resin material is preferable.

Description of the Print Element Substrate

Figure 9A:
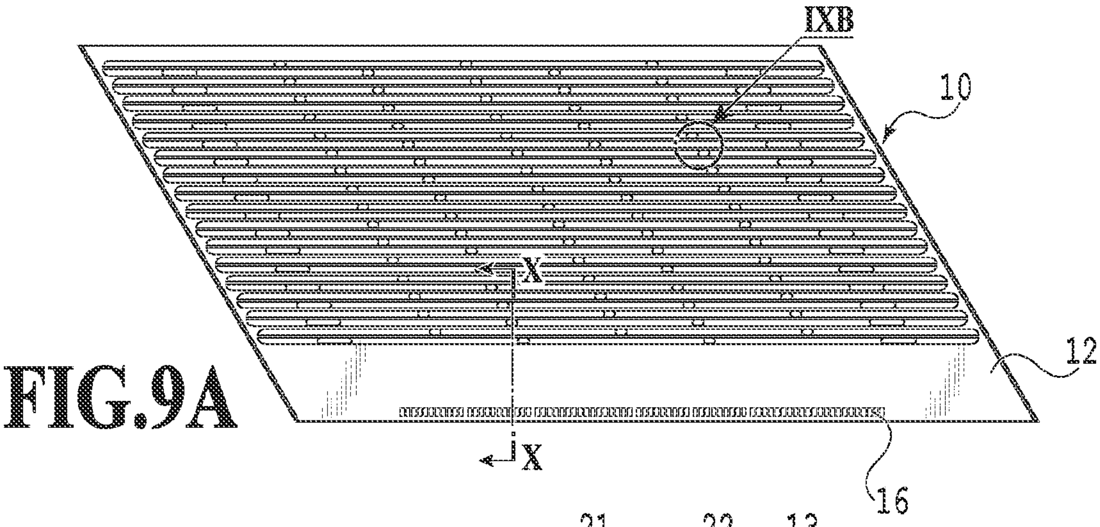
FIGS. 9A to 9C are plan views and an enlarged view, respectively, of the print element substrate on an ejection port surface side of the liquid ejection head according to the present disclosure.
Figure 9B:
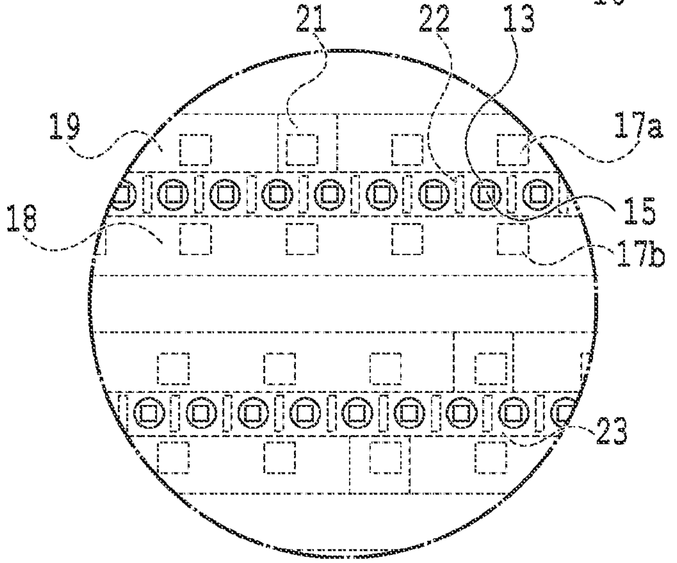
Figure 9C:
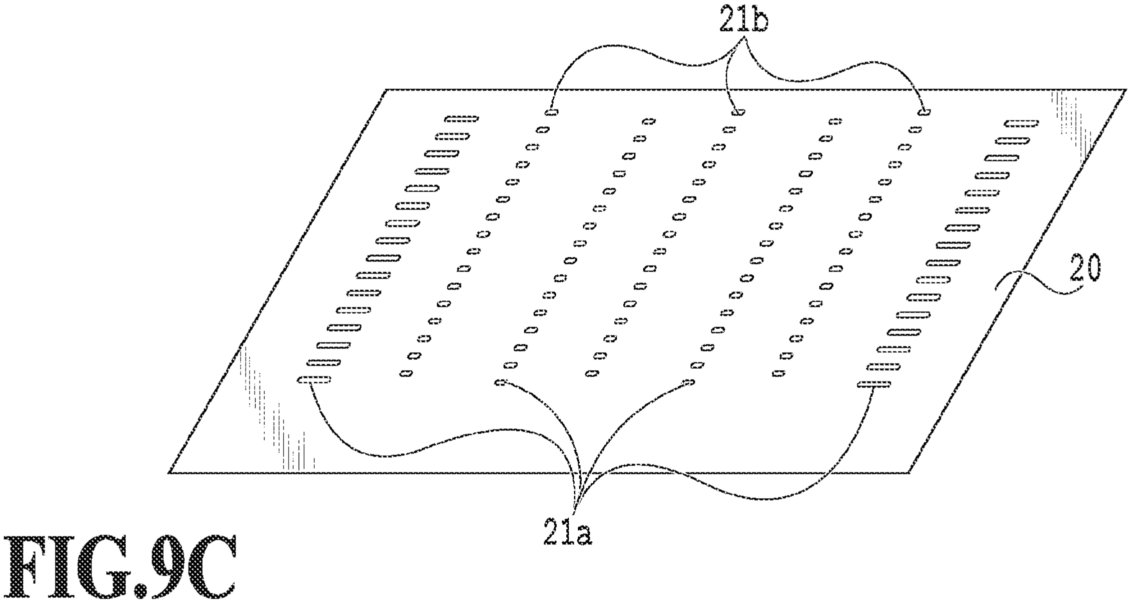

The configuration of the print element substrate 10 according to the present embodiment will be described. FIG. 9A shows a plan view of the surface of the print element substrate 10 on which an ejection port 13 is formed, FIG. 9B shows an enlarged view of the portion denoted by IXB in FIG. 9A, and FIG. 9C shows a plan view of a back surface opposite to the surface shown in FIG. 9A. Here, the configuration of the print element substrate 10 in the present embodiment will be described. It should be noted that hereinafter, a direction in which an ejection port array in which a plurality of the ejection ports 13 are arrayed extends will be referred to as "ejection port array direction."

As shown in FIG. 9B, a print element 15, which is a heating element (pressure generating element) to foam liquid using generated thermal energy, is arranged in a position corresponding to one of the ejection ports 13. A pressure chamber 23 having the print element 15 therein is defined by a partition 22. The print element 15 is electrically connected to the terminal 16 by electrical wiring (not shown) provided in the print element substrate 10. The print element 15 then generates heat based on a pulse signal inputted from a control circuit in the printing apparatus 1000 via the electrical wiring substrate 90 (see FIG. 5) and the flexible wiring substrate 40 (see FIGS. 8A and 8B) to boil liquid. The liquid is ejected from the ejection port 13 by a bubbling force generated by this boiling. As shown in FIG. 9B, along each ejection port array, a liquid supply path 18 extends on one side, and a liquid collecting path 19 extends on the other side. The liquid supply path 18 and the liquid collecting path 19 are channels extending in the ejection port array direction provided in the print element substrate 10 and communicate with the ejection port 13 via a supply port 17*a* and a collecting port 17*b*, respectively.

As shown in FIG. 9C, a sheet-like cover plate 20 is laminated on the back side opposite to the surface of the print element substrate 10 on which the ejection port 13 is formed, and the cover plate 20 is provided with a plurality of openings 21 communicating with the liquid supply path 18 and the liquid collecting channel 19 to be described later. In the present embodiment, the cover plate 20 is provided with four supply openings 21*a* for one liquid supply path 18 and three collecting openings 21*b* for one liquid collecting path 19. However, the number of openings is not limited to them. As shown in FIG. 9B, each opening 21 of the cover plate 20 communicates with the communication port 51 shown in FIG. 7A. The cover plate 20 preferably has sufficient corrosion resistance to liquid, and the shape and position of the opening 21 require high accuracy so that ink is supplied to the pressure chamber. Thus, it is preferable to use a photosensitive resin material or a silicon plate as a material for the cover plate 20 and provide the opening 21 by a photolithography process. The thickness of the cover plate is preferably about 30 to 600 μm from the viewpoint of strength and workability.

Figure 10:
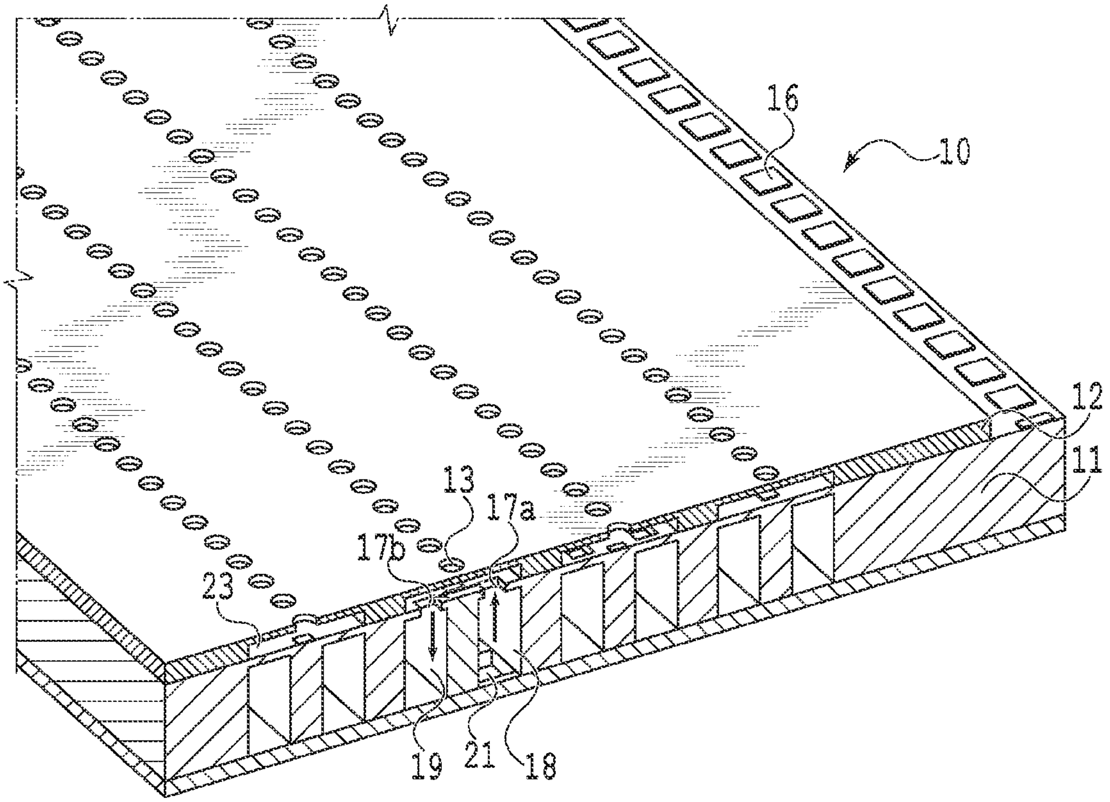
FIG. 10 is a cross-sectional view taken along line X-X in FIG. 9A.

FIG. 10 is a perspective view showing a cross section of the print element substrate 10 and the cover plate 20 taken along line X-X in FIG. 9A. FIG. 10 shows four ejection port arrays in an ejection port forming member 12 of the print element substrate 10, but the present disclosure may include more or fewer ejection port arrays. Here, a liquid flow within the print element substrate 10 will be described. The cover plate 20 has a function as a lid that forms a portion of the walls of the liquid supply path 18 and the liquid collecting path 19 formed in a substrate 11 of the print element substrate 10. In the print element substrate 10, the substrate 11 made of Si and the like and the ejection port forming member 12 made of a photosensitive resin are laminated together, and the cover plate 20 is bonded to the back surface of the substrate 11. The print element 15 is formed on one side of the substrate 11 (see FIGS. 9A to 9C), and on the back side opposite to the one side, a groove forming the liquid supply path 18 and the liquid collecting path 19 extending along the ejection port arrays is formed. The liquid supply path 18 and the liquid collecting path 19 formed of the substrate 11 and the cover plate 20 are connected to the common supply channel 211 and the common collecting channel 212 in the channel member 210, respectively, and a pressure difference is generated between the liquid supply path 18 and the liquid collecting path 19. Due to this pressure difference, liquid in the liquid supply path 18 provided in the substrate 11 flows to the liquid collecting path 19 via the supply port 17*a*, the pressure chamber 23, and the collecting port 17*b* (a flow indicated by an arrow C in FIG. 10). This flow makes it possible to collect thickened ink, bubbles, foreign matter, and the like generated by evaporation from the ejection port 13 into the liquid collecting path 19 in the ejection port 13 and the pressure chamber 23 that are not in an ejection operation and suppress an increase in the viscosity of ink or in the concentration of a color material in the ejection port 13 and the pressure chamber 23. The liquid collected into the liquid collecting path 19 passes through the opening 21 of the cover plate 20 and the support member communication port 31 of the support member 30 as shown in FIGS. 7A and 7B. The liquid to the liquid collecting path 19 is then collected through the support member communication port 31 of the support member 30, the communication port 51 of the first channel member 50, and the common collecting channel 212 in this order, and is collected into a supply path (FIG. 3) in the printing apparatus 1000.

Description of Embodiments of the Present Disclosure

First Embodiment

A first embodiment of the present disclosure will be described. Descriptions of functions and configurations similar to the basic configuration of the present disclosure will be omitted, and differences will be described.

Figure 11A:
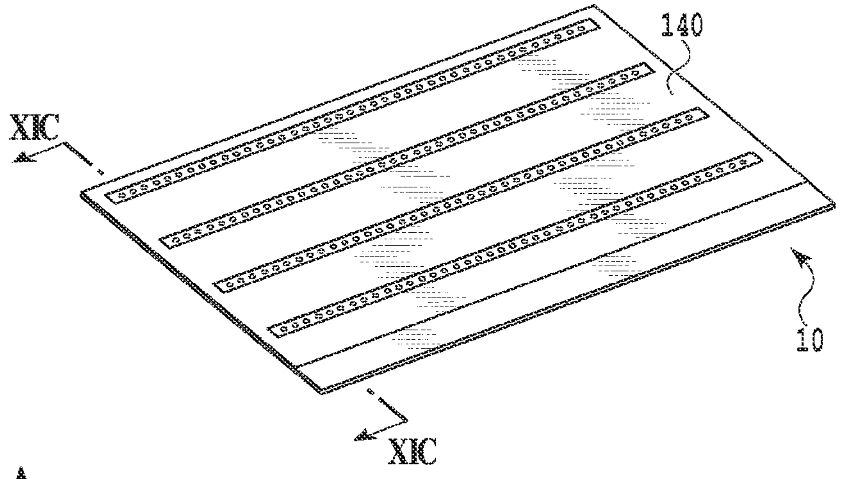
FIGS. 11A to 11C are a perspective view, an exploded perspective view, and a cross-sectional view, respectively, of the ejection module of the liquid ejection head according to a first embodiment.
Figure 11B:
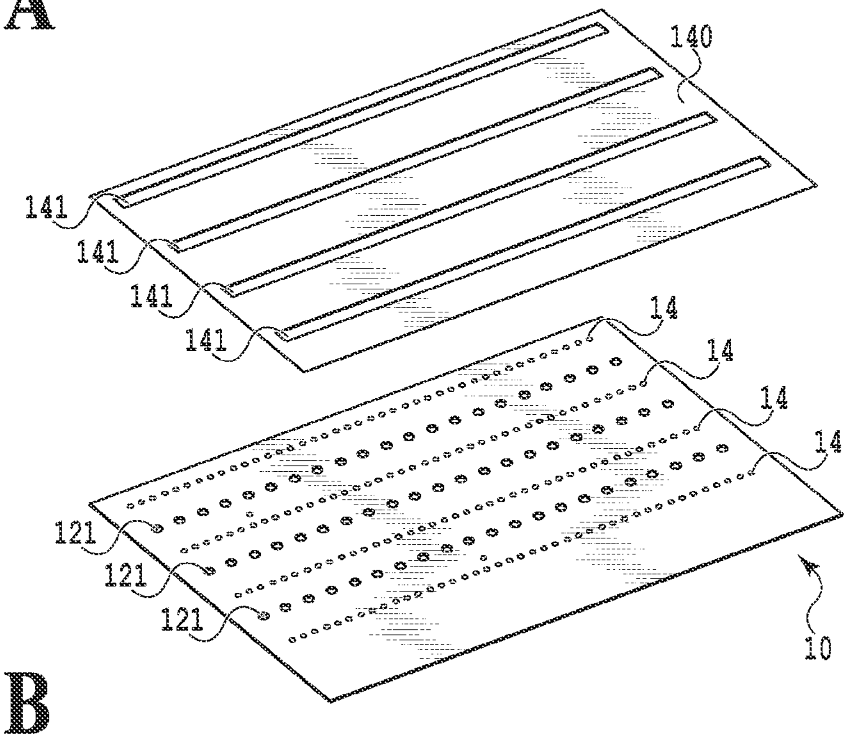
Figure 11C:
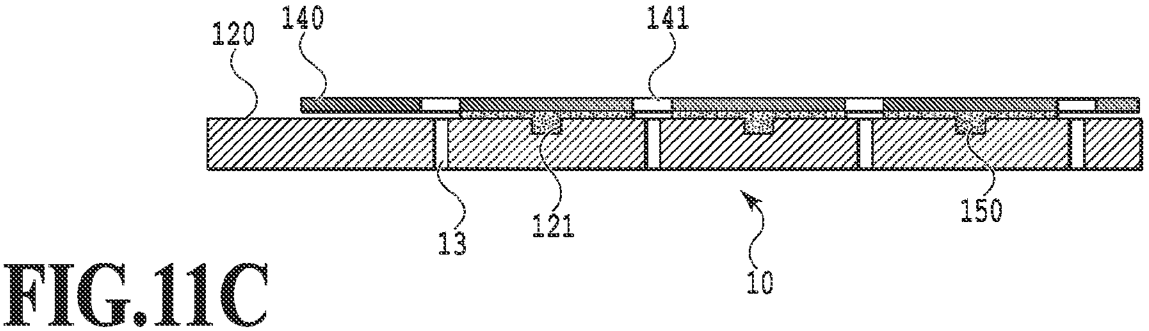
Figure 12:
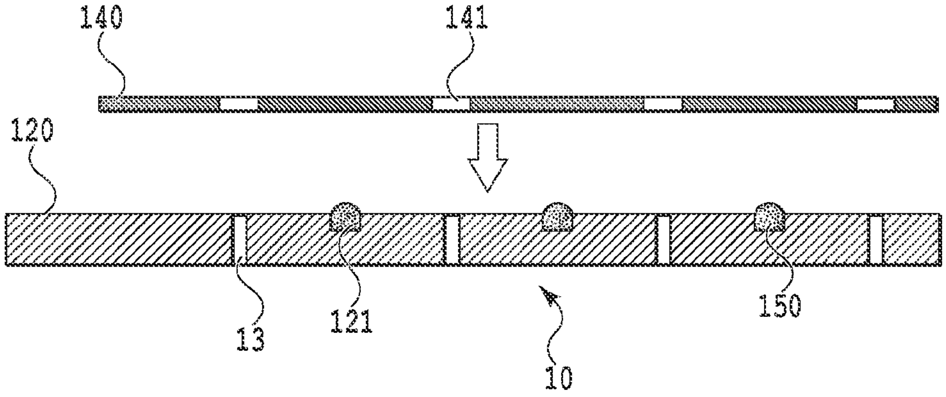
FIG. 12 is a schematic diagram showing an adhesive application state in FIGS. 11A to 11C.

FIG. 11A is a perspective view of a simplified ejection module according to the first embodiment. FIG. 11B is an exploded perspective view of FIG. 11A. FIG. 11C is a cross-sectional view taken along line XIC-XIC in FIG. 11A. FIG. 12 is a schematic diagram showing an adhesive application state in FIG. 11C. In FIGS. 11A, 11B, 11C, and 12, a portion of the configurations is simplified to facilitate understanding.

The present embodiment is different from the basic configuration in that a protection member 140 is laminated on the surface (ejection surface 120) of the ejection port forming member 12. Specifically, as shown in FIGS. 11B and 11C, an opening 141 corresponding to an ejection port array 14 is formed in the protection member 140, and a recessed portion 121 is formed between the adjacent ejection port arrays 14 in the ejection surface 120. The ejection surface 120 and the protection member 140 are adhered to each other with an adhesive 150 applied to the recessed portion 121. With such a configuration, in a case where the print medium 2 floats up during conveyance, the protection member 140 plays a role in preventing contact between the print medium 2 and the print element substrate 10, thereby reducing the risk of damage to the liquid ejection head 3.

The print medium 2 may be an offset print sheet or the like, which may contain mineral particles such as silica and calcium carbonate in a coating layer. In the case of collision during conveyance, these particles fall off and rub against the ejection surface, so that the ejection surface is damaged. Since these minerals have an elastic modulus of a few tens of gigapascals (GPa) or more, it is preferable that the protection member also have an elastic modulus of 50 GPa or more, and as the material, a metal material such as stainless steel, titanium, and aluminum, silicon, or alumina can be suitably used. Further, it is preferable that the length of the opening 141 of the protection member 140 in a direction substantially intersecting the ejection port array direction be 250 μm or more and less than an interval between the adjacent ejection port arrays 14, and the thickness of the protection member 140 be less than 50 μm. As a result, in a case where a cleaning mechanism (not shown) of the printing apparatus abuts the liquid ejection head 3 during maintenance at the time of printing, the cleaning mechanism (not shown) can more suitably collect liquid in the liquid ejection head 3. Thus, it is preferable that the outer shape and opening 141 of the protection member 140 be worked with high accuracy, and as a working method, for example, etching, laser working, or press working can be suitably used.

As shown in FIG. 12, the adhesive 150 is applied to the recessed portion 121. Applying the adhesive to the recessed portion 121 can make an adhesive force stronger than the case of applying the adhesive to a flat portion in the ejection surface 120. At this time, it is preferable that the ejection surface 120 have water repellency against liquid and the recessed portion 121 have non-water repellency. As a result, the adhesive 150 can easily remain in the recessed portion 121, and the risk of the adhesive 150 flowing into the ejection port 13 can be reduced. As the adhesive 150, for example, a thermosetting adhesive can be suitably used. Further, in order to further strengthen the force of adhesion between the ejection surface 120 and the protection member 140, a method of forming a contact layer (not shown) on at least the ejection surface 120 side of the protection member 140 can also be suitably used.

Figure 13:
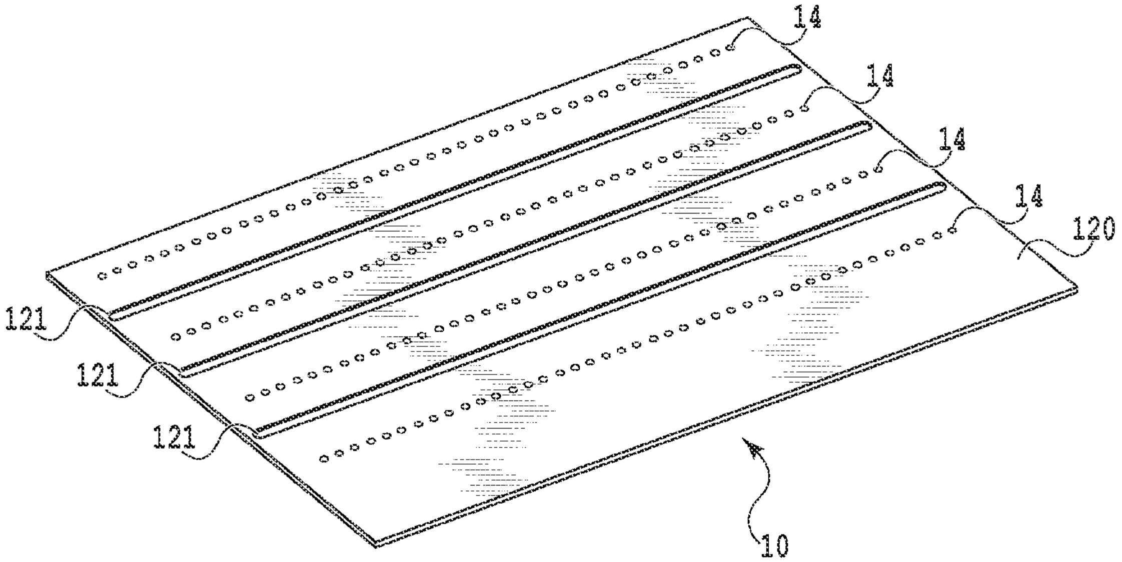
FIG. 13 is a perspective view showing a modification of the ejection module of the liquid ejection head according to the first embodiment.
Figure 14A:
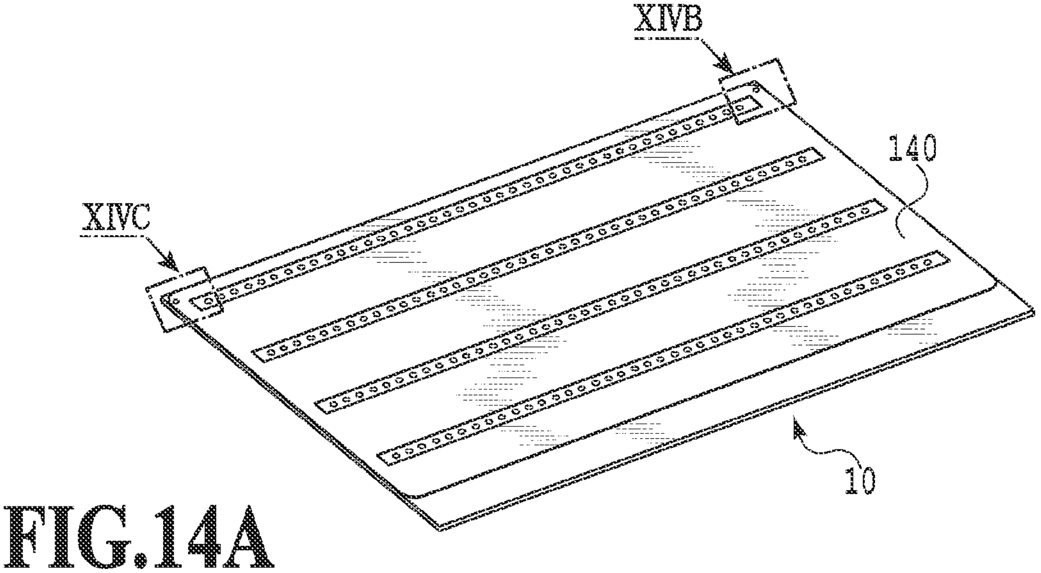
FIGS. 14A to 14C are a perspective view and partially enlarged views, respectively, showing a modification of the ejection module of the liquid ejection head according to the first embodiment.
Figure 14B:
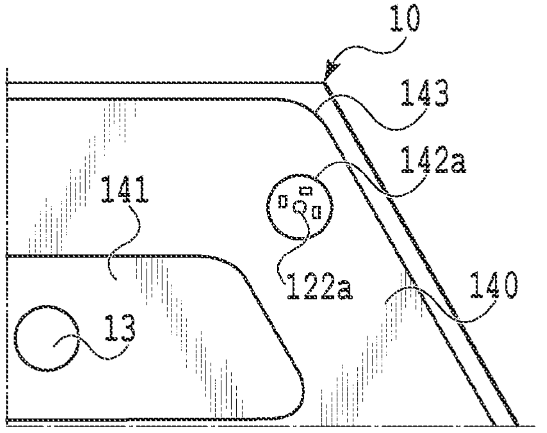
Figure 14C:
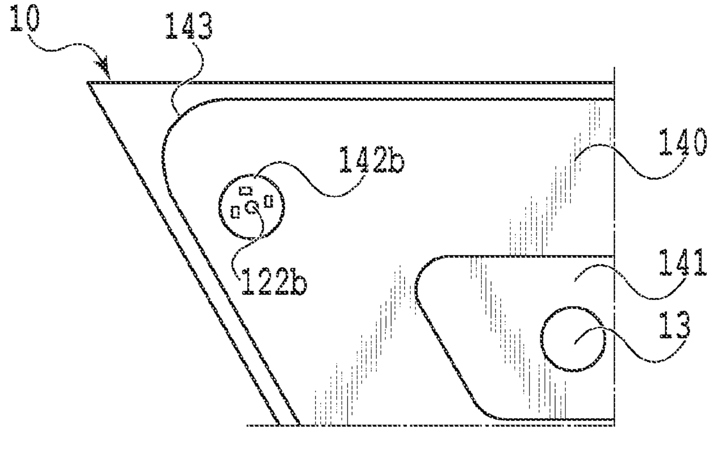

FIG. 13 is a perspective view of a simplified print element substrate showing a modification of FIG. 11B. FIG. 14A is a perspective view of a simplified ejection module showing a modification of FIG. 11A. FIG. 14B is an enlarged view of the portion denoted by XIVB in FIG. 14A. FIG. 14C is an enlarged view of the portion denoted by XIVC in FIG. 14A. In FIGS. 13, 14A, 14B, and 14C, a portion of the configurations is simplified to facilitate understanding. As one modification of the first embodiment, as shown in FIG. 13, the recessed portions 121 formed between the adjacent ejection port arrays 14 may be connected in a groove shape. Such a configuration makes it possible to make the force of adhesion between the ejection surface 120 and the protection member 140 stronger. Further, as another modification of the first embodiment, as shown in FIGS. 14A, 14B, and 14C, a radiused shape 143 may be formed at the corners of the protection member 140. With such a configuration, in a case where the cleaning mechanism (not shown) of the printing apparatus abuts the liquid ejection head 3 during maintenance at the time of printing, the risk of damage to the cleaning mechanism (not shown) due to the corners of the protection member 140 can be reduced. Further, in order to avoid alignment marks 122*a* and 122*b* used for positioning between the adjacent print element substrates 10, openings 142*a* and 142*b* for pattern avoidance can also be formed in the protection member 140. In addition, a cut portion (not shown) can also be formed in the protection member 140 in accordance with a pattern on the printing element substrate, such as a print element substrate number (not shown) used to identify the printing element substrate 10. At that time, forming a radiused shape in the cut portion (not shown) makes it possible to reduce the risk of damage to the cleaning mechanism (not shown).

Characteristics of the Protection Member of the Present Embodiment

The example of the protection member 140 described above is a brief description. The protection member 140 according to the present embodiment in which a recessed portion having a projection portion formed therein is formed will be described in detail with reference to FIGS. 15A to 18E.

Figure 15A:
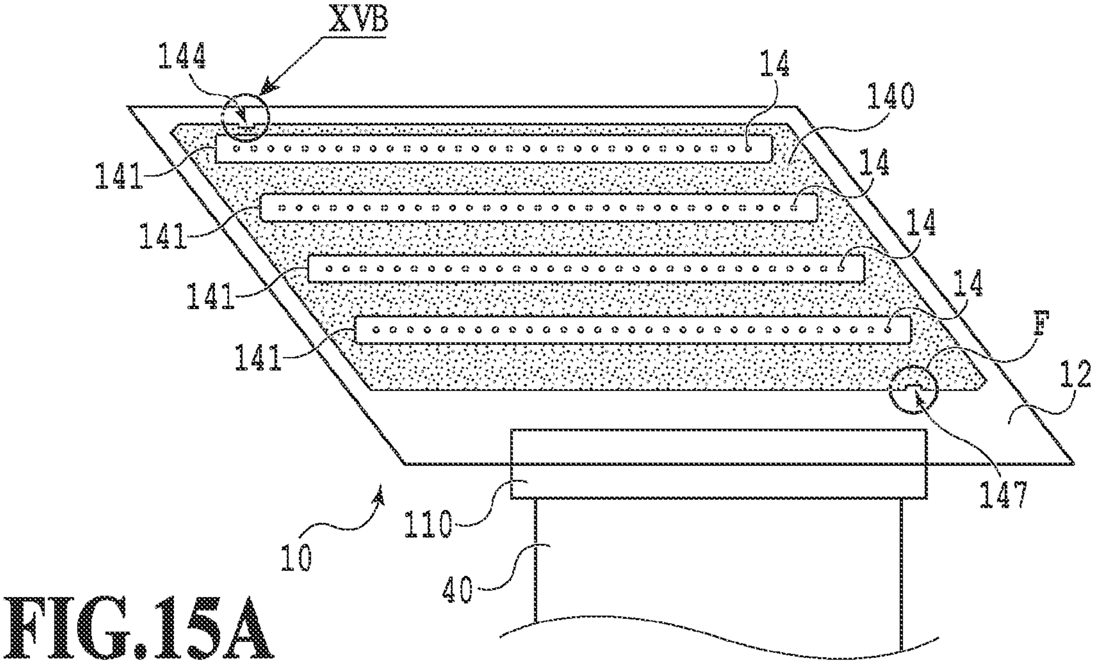
FIGS. 15A to 15C are a schematic diagram, a partially enlarged view, and a cross-sectional view, respectively, of the ejection module of the liquid ejection head according to the present disclosure.
Figure 15B:
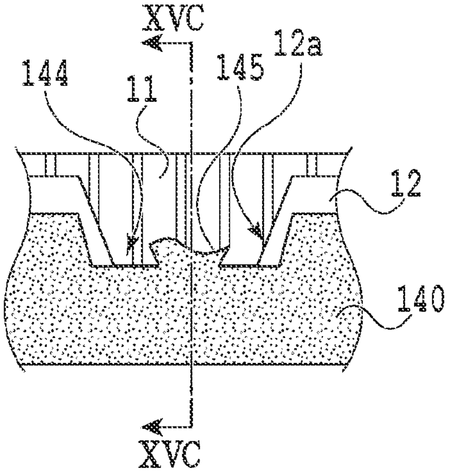
Figure 15C:
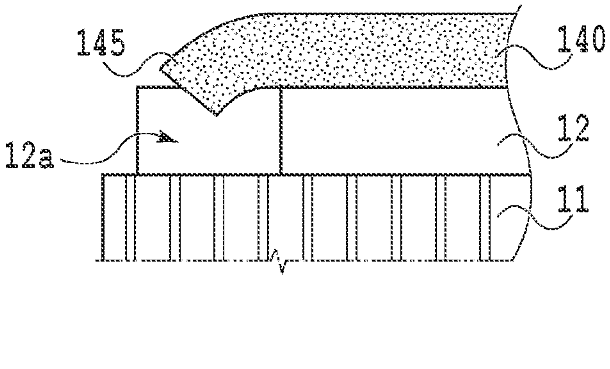

FIG. 15A is a schematic diagram of a simplified ejection module. FIG. 15B is an enlarged view of the portion denoted by XVB in FIG. 15A. FIG. 15C is a cross-sectional view taken along line XVC-XVC in FIG. 15B.

In the process of manufacturing the protection member 140, a plurality of protection members are formed in one sheet and are connected to each other via a connecting portion. For example, one protection member is provided by separating the connecting portion due to a vibration. At this time, in a case where the connecting portion is separated, a projection portion is formed in the protection member 140 in a direction orthogonal to the ejection port array 14 of the print element substrate 10.

Thus, in a direction orthogonal to the ejection port array 14 of the print element substrate 10, the protection member 140 according to the present embodiment is provided with at least one recessed portion 144 at an end parallel to the direction of the ejection port array 14 and a projection portion 145 that projects in a direction orthogonal to the ejection port array 14 of the print element substrate 10. The projection portion 145 is provided inside the recessed portion 144 of the protection member 140. As a result, the projection portion 145 is provided within a formation area where the protection member 140 is formed without projecting from the protection member 140.

Further, as shown in FIG. 15C, the ejection port forming member 12 is provided with a recessed portion 12*a* corresponding to the projection portion 145 of the protection member 140 in a direction orthogonal to the ejection port array 14 of the print element substrate 10 and in a vertical direction. The recessed portion 12*a* of the ejection port forming member 12 is formed to expose the substrate 11 located vertically in a lower position. The projecting projection portion 145 of the protection member 140 is accommodated in the recessed portion 12*a* of the ejection port forming member 12. As a result, the projection portion 145 is accommodated in the recessed portion 12*a* and does not contact the ejection surface 120, so that it is possible to suppress floating up of the protection member 140.

The protection member 140 has a recessed portion 144 (first recessed portion) at an end parallel to the ejection port array direction in a direction orthogonal to the ejection port array 14 of the print element substrate 10 and may have a recessed portion 147 (second recessed portion) at the other end opposite to the end. The recessed portion 144 at the end and the recessed portion 147 at the other end are formed at the same position as the recessed portion 12*a*. As a result, the recessed portion 12*a* is provided to correspond to the projection portion 145 of the protection member 140, can accommodate the projection portion 145, and can suppress floating up of the protection member 140.

Figure 16A:
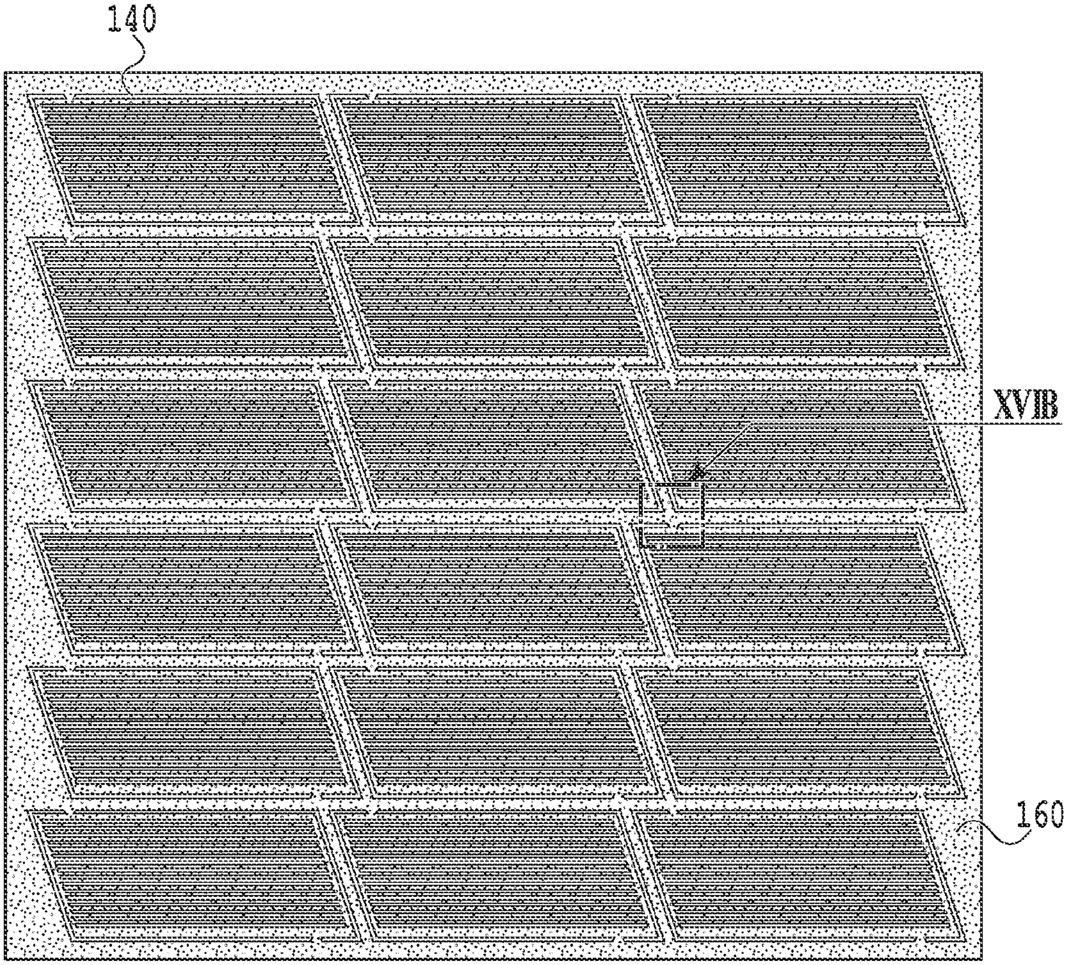
FIGS. 16A to 16C are a plan view and partially enlarged views, respectively, of a plurality of protection members molded into one sheet in the liquid ejection head according to the present disclosure.
Figure 16B:
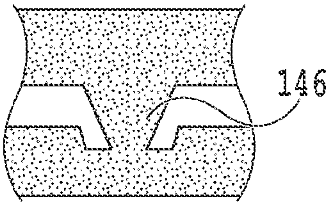
Figure 16C:
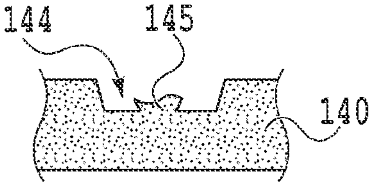

FIG. 16A is a plan view of a plurality of protection members molded into one sheet of the liquid ejection head according to the present disclosure, and FIG. 16B is a partially enlarged view of the portion XVIB in FIG. 16A. FIG. 16C is a partially enlarged view of FIG. 16B in the state of being separated from the sheet due to a vibration.

The protection member 140 according to the present embodiment has a thickness of 50 um or less in order to reduce cost, and a plurality of the protection members 140 are formed by etching a single large material sheet 160 to prevent burrs from being formed in the opening 141 or the like.

As shown in FIG. 16B, the plurality of protection members 140 are connected via a connecting portion 146 and are separated from the connecting portion 146 by vibrating the sheet 160. As a result, as shown in FIG. 16C, the projection portion 145 is formed in a direction in which the protection member 140 is substantially orthogonal to the ejection port array direction. The shape of the connecting portion 146 may be tapered so as to become narrower toward the protection member 140 or may be tapered so as to become wider toward the protection member 140. The shape of the connecting portion 146 is preferably tapered so as to become narrower toward the protection member 140. However, preferably, it is only required that the width of a portion connected to the protection member 140 be shorter. This enables easy separation from the connecting portion 146 by generating a vibration. Further, in a case where the width of the portion connected to the protection member 140 is shorter, the recessed portion 12*a* of the ejection port forming member 12 can be formed to have a small size.

However, although the protection member 140 can be produced at low cost by being vibrated and separated as described above, the inventors have discovered that the projection portion 145 may be twisted due to the vibration and may be deformed upward or downward with respect to the vertical direction.

Figure 17A:
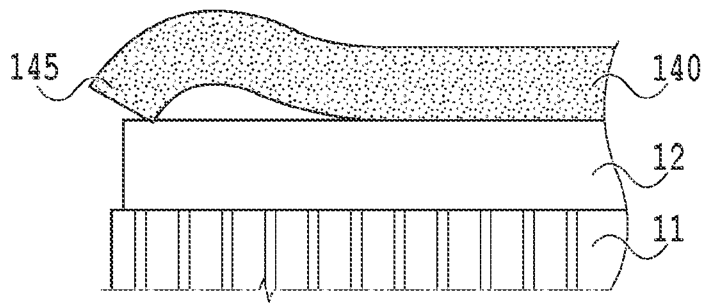
FIGS. 17A to 17C are a schematic cross-sectional view showing a print element substrate of a comparative example, a cross-sectional view of the print element substrate according to the present disclosure, and a cross-sectional view showing a modification, respectively.
Figure 17B:
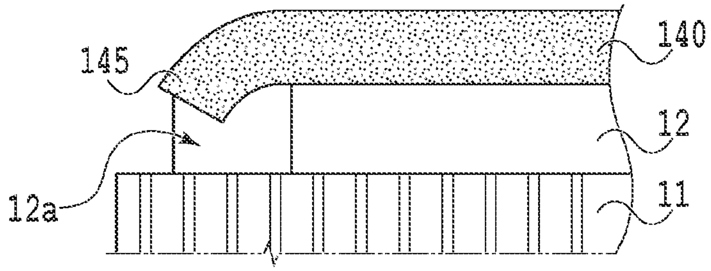
Figure 17C:
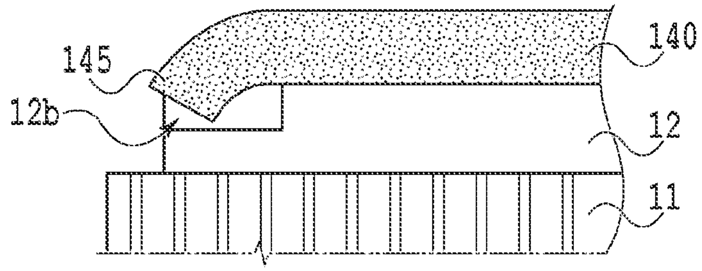

FIGS. 17A to 17C are a schematic cross-sectional view showing a print element substrate as a comparative example different from that in the present embodiment, a cross-sectional view of the print element substrate according to the present disclosure, and a cross-sectional view showing a modification.

A case will be described where the projection portion 145 of the protection member 140 is deformed upward with respect to the vertical direction. Since there is a risk that the cleaning mechanism (not shown) of the printing apparatus 1000 abuts the projection portion 145 and is damaged during maintenance at the time of printing, it is desirable that the projection portion 145 be provided in a position where the projection portion 145 does not contact the cleaning mechanism.

In the present embodiment, a sealing portion 110 (see FIG. 15A), which is a portion connecting the substrate 11 and the flexible wiring substrate 40, is located higher than the print element substrate 10 in the vertical direction, and the cleaning mechanism is driven in the ejection port array direction to avoid the sealing portion 110 and the like. The projection portion 145 is provided in the positions denoted by XVB and F in FIG. 15A of a side parallel to the ejection port array in the protection member 140 by etching or the like during the manufacturing process so as not to contact the cleaning mechanism.

In a case where the projection portion 145 of the protection member 140 is deformed downward with respect to the vertical direction, in the comparative example, the projection portion 145 may interfere with the ejection surface 120 and the protection member 140 may deform and float up, as shown in FIG. 17A. In a case where an area from an end of the protection member 140 to the opening 141 of the protection member 140 is large, floating up is suppressed due to the rigidity of the protection member 140; in a case where the area from the end of the protection member 140 to the opening 141 of the protection member 140 is small, floating up is likely to occur. As in the present embodiment, the projection portion 145 may be formed on the opposite side of the sealing portion 110 (see FIG. 15A) of the print element substrate 10. In this case, since the area from the end of the protection member 140 to the opening 141 of the protection member 140 is small, in a case where the projection portion 145 is deformed downward in the vertical direction, the protection member is likely to float up at the time of interference with the ejection surface 120.

Therefore, in the present embodiment, as shown in FIG. 17B, the ejection port forming member 12 is provided with the recessed portion 12*a* so that the deformation of the projection portion 145 does not interfere with the ejection surface 120. As a result, even in a case where the projection portion 145 is deformed downward in the vertical direction, the projection portion 145 and the ejection surface 120 do not interfere with each other, and it is possible to suppress floating up of the protection member 140.

In the ejection port forming member 12 according to the present embodiment, in the case of forming an ejection port or a pressure chamber on the substrate 11, the recessed portion 12*a* of the ejection port forming member 12 is provided in a position where the ejection port forming member 12 corresponds to the projection portion 145 and is formed so as to expose the surface of the substrate 11. A portion where the surface of the substrate 11 is exposed is located on the opposite side of the sealing portion 110, and no main circuit is provided inside the substrate. Thus, even in a case where electrical noise is mixed from the portion where the substrate 11 is exposed, there is a low probability of being affected.

Further, as shown in FIG. 17C, the recessed portion 12*b* may be formed in the ejection port forming member 12 so that the substrate 11 is not exposed. As a result, the height of the recessed portion in the vertical direction is reduced, so that the projection portion 145 becomes closer to the ejection port forming member 12 than the case of the recessed portion 12*a* where the surface of the substrate 11 is exposed. However, since the substrate 11 is covered with the protection member 140, resistance to the electrical noise increases.

In the present embodiment, the projection portion 145 is formed by separating the connection between the material sheet and the protection member 140. However, the projection portion 145 may also be provided in the protection member 140 on a side opposite to the side on which the projection portion 145 is formed. As shown in FIG. 15A, the projection portion 145 is provided in the protection member 140 on the sealing portion 110 side (see a region F in FIG. 15A). On the print element substrate 10, since wiring in the substrate is routed from the sealing portion 110 side toward the ejection port array, a distance from the ejection port array 14 closest to the sealing portion 110 side of the print element substrate 10 to the end of the ejection port forming member 12 near the sealing portion 110 is long. As a result, in a case where the protection member 140 is arranged on the print element substrate 10, the area of the protection member 140 on the sealing portion 110 side can be increased. In a case where a recessed portion corresponding to the projection portion 145 is provided in the position shown by the region F in FIG. 15A, it is possible to further suppress floating up of the protection member 140. On the other hand, in a case where no recessed portion is provided, it is possible to suppress electrical noise mixture due to exposure of the substrate 11.

Figure 18A:
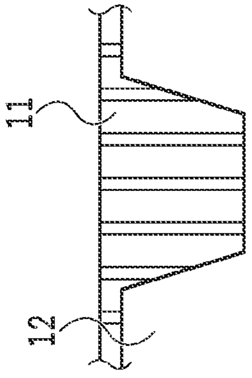
FIGS. 18A to 18E are enlarged views showing a recessed portion and an opening of the protection member of the liquid ejection head according to the present disclosure.
Figure 18B:
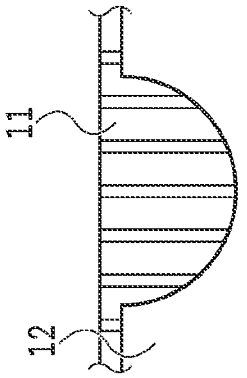
Figure 18C:
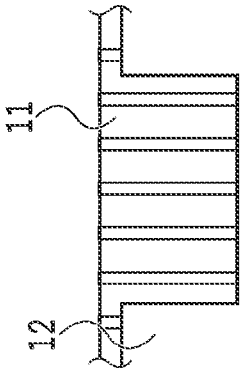
Figure 18D:
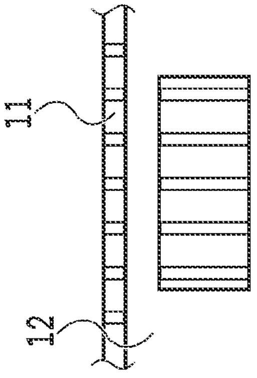
Figure 18E:
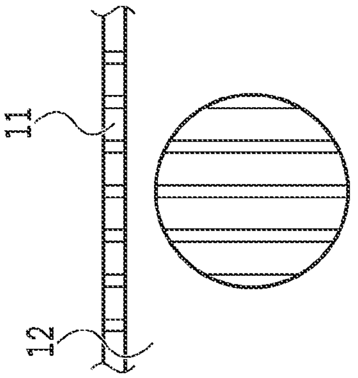

The shape of the recessed portion of the ejection port forming member 12 may be any shape as long as the projection portion 145 of the protection member 140 does not interfere with the ejection surface 120 in a case where the projection portion 145 of the protection member 140 is deformed vertically downward. For example, the shape of the recessed portion 12*b* may be a trapezoid, a semicircle, or a rectangle, as shown in FIGS. 18A to 18C. Further, it does not necessarily have to be the recessed portion, but an opening that can accommodate the projection portion 145 may also be provided. For example, as shown in FIGS. 18D and 18E, a square opening or a circular opening may be provided. The projection portion 145 can be accommodated in each of the provided openings. Thus, it is possible to suppress floating up of the protection member 140 due to interference between the projection portion 145 of the protection member 140 and the ejection surface 120.

Second Embodiment

A second embodiment of the present disclosure will be described. Descriptions of functions and configurations similar to those in the first embodiment of the present disclosure will be omitted, and differences will be described.

Figure 19A:
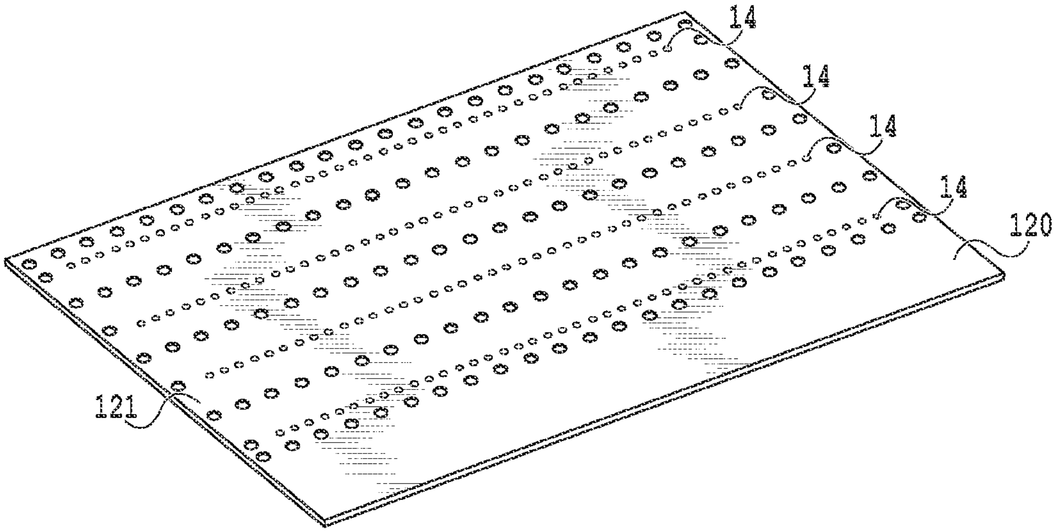
FIGS. 19A and 19B are perspective views showing a modification of a print element substrate of a liquid ejection head according to a second embodiment.
Figure 19B:
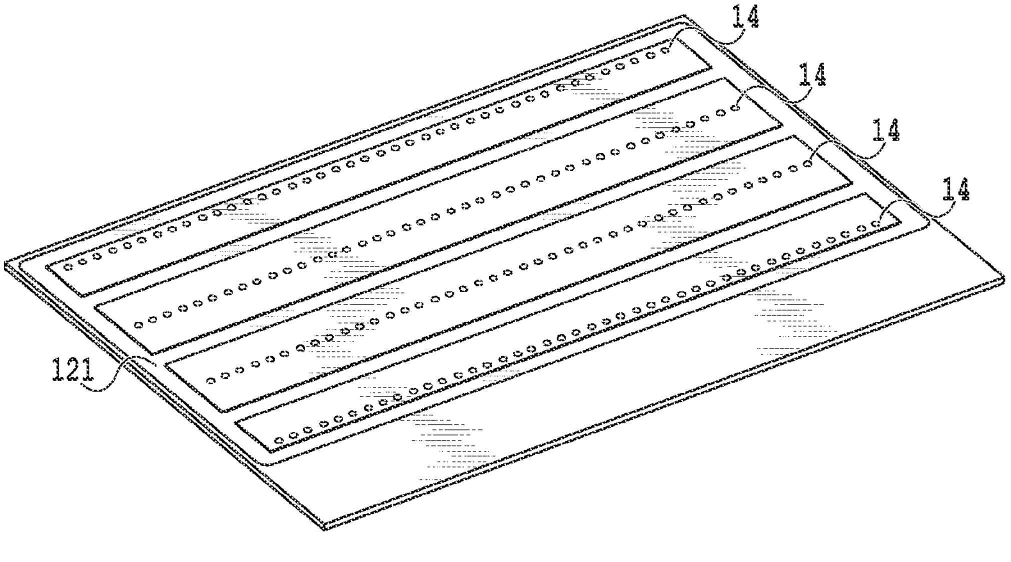
Figure 20A:
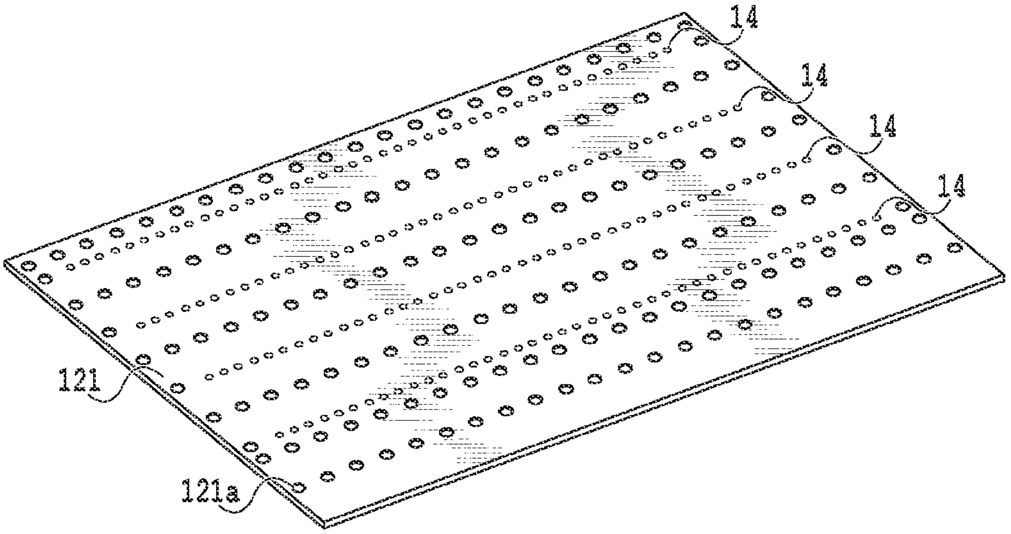
FIGS. 20A and 20B are perspective views showing a modification of the print element substrate of the liquid ejection head according to the second embodiment.
Figure 20B:
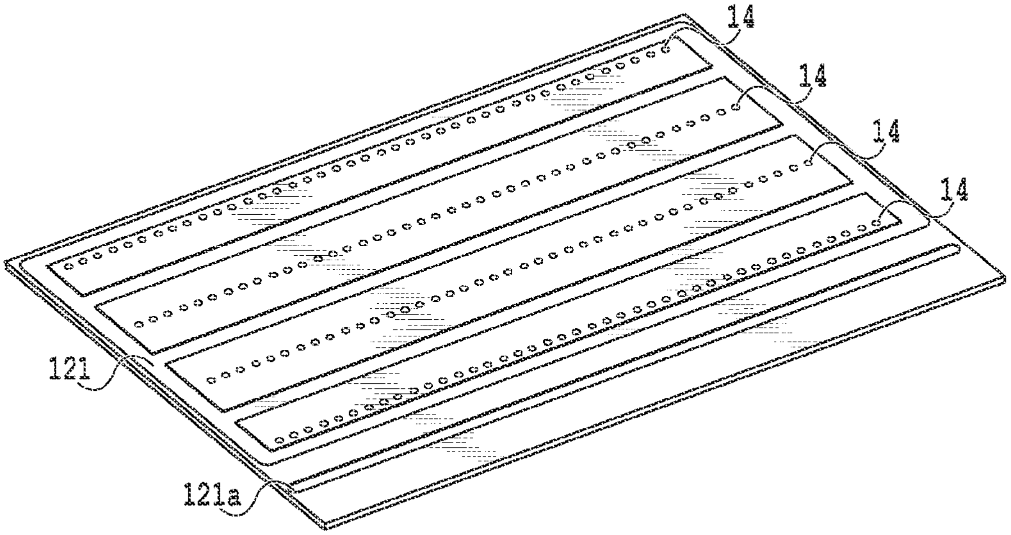

FIG. 19A is a perspective view of a simplified print element substrate according to the second embodiment. FIG. 19B is a perspective view of a simplified print element substrate showing a modification of FIG. 19A. FIGS. 20A and 20B are perspective views of a simplified print element substrate showing a modification of FIG. 19A. In FIGS. 19A, 19B, 20A, and 20B, a portion of the configurations is simplified to facilitate understanding.

The second embodiment is different from the first embodiment in that the recessed portions 121 are formed not between the adjacent ejection port arrays 14, but to surround each of the plurality of ejection port arrays 14, as shown in FIG. 19A. With such a configuration, the number of adhered positions increases, so that the force of adhesion between the ejection surface 120 and the protection member 140 can be made stronger. Further, as one modification of the second embodiment, as shown in FIG. 19B, the recessed portions 121 formed so as to surround each of the plurality of ejection port arrays 14 may be connected in a groove shape. With such a configuration, the force of adhesion between the ejection surface 120 and the protection member 140 can be made stronger. Furthermore, as another modification of the second embodiment, as shown in FIGS. 20A and 20B, in each ejection port array 14 arrayed at the end of the substrate 10 in the transverse direction, recessed portions 121*a* different from the recessed portions 121 may also be formed outside the recessed portions 121 formed so as to surround the ejection port array. With such a configuration, in the case of wiring the flexible wiring substrate 40 only on one side of the substrate 10 in the transverse direction, the ejection surface 120 and the protection member 140 can be adhered more suitably, and the force of adhesion between the ejection surface 120 and the protection member 140 can be made stronger.

Third Embodiment

In a third embodiment according to the present disclosure, there is a case where an identification number 200 is formed on a functionally unaffected portion such as an end of the print element substrate 10 so that a manufacturing history can be determined, and such a configuration will be described. Descriptions of functions and configurations similar to those in the first and second embodiments of the present disclosure will be omitted, and differences will be described.

Figure 21C:
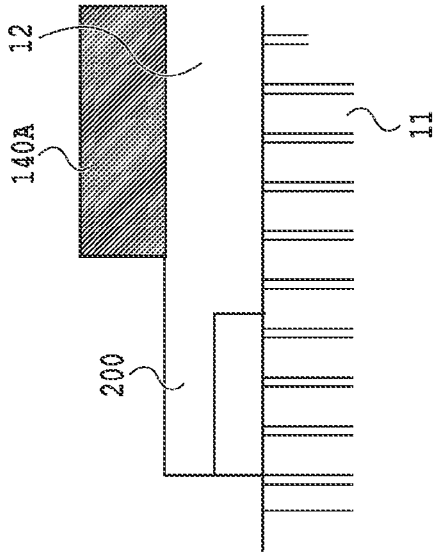
FIGS. 21A to 21C are a partially enlarged view and a sectional view of a print element substrate of a liquid ejection head according to a third embodiment, and a partially enlarged view of a protection member, respectively.
Figure 21A:
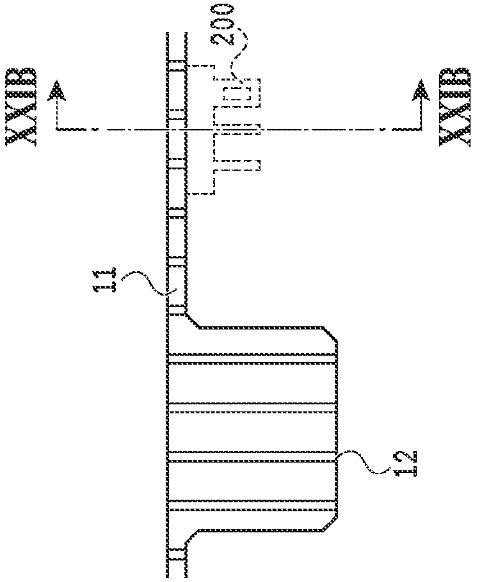
Figure 21B:
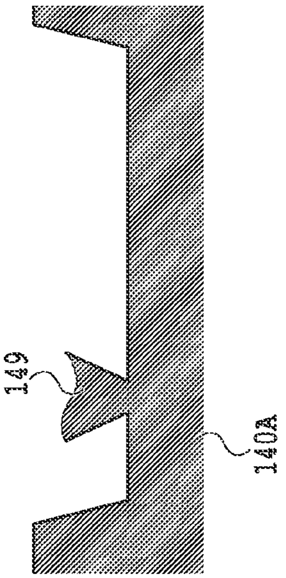

FIG. 21A is a partially enlarged view of the print element substrate 10 provided with the identification number 200 of the liquid ejection head 3 according to the third embodiment, and FIG. 21B is a schematic cross-sectional view taken along line XXIB-XXIB. Further, FIG. 21C is a partially enlarged view of the protection member 140A of the liquid ejection head 3 according to the third embodiment.

As shown in FIG. 21A, the ejection port forming member 12 according to the present embodiment is provided with the identification number 200 for determining the manufacturing history near a recessed portion of the ejection port forming member 12. As shown in FIGS. 21A and 21C, the identification number 200 is formed so as to hollow out the ejection port forming surface 12. As shown in FIG. 21B, a recessed portion is formed in a protection member 140A so that the protection member 140A does not overlap the identification number 200 in a case where the protection member 140A is attached to the print element substrate 10. As a result, the identification number 200 formed on the ejection port forming member 12 can be visually observed while a recessed portion corresponding to the projection portion 149 is provided. Incidentally, the recessed portion is formed in the protection member 140A so that the protection member 140A does not overlap the identification number 200 in order to visually observe the identification number 200, but the present disclosure is not limited to this, and an opening may also be formed so that the identification number 200 can be recognized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-069132, filed Apr. 20, 2023, which is hereby incorporated by reference herein in its entirety.

What is claimed is:

1. A liquid ejection head comprising:

a print element substrate having an ejection port forming member including an ejection surface on which a plurality of ejection port arrays for ejecting liquid are formed; and a protection member having an opening corresponding to one of the ejection port arrays, wherein the protection member is provided with at least one recessed portion at an end parallel to a direction of the plurality of ejection port arrays in a direction orthogonal to the plurality of ejection port arrays and with a projection portion projecting in the direction orthogonal to the plurality of ejection port arrays, wherein the projection portion is provided inside the at least one recessed portion, and wherein the ejection port forming member has a corresponding recessed portion corresponding to the projection portion in the direction orthogonal to the plurality of ejection port arrays.

2. The liquid ejection head according to claim 1, wherein the protection member has a first recessed portion as the recessed portion at a first end parallel to the ejection port array direction and a second recessed portion as the recessed portion at a second end opposed to the first end.

3. The liquid ejection head according to claim 2, wherein the protection member has a larger area from a side of the other end to the opening than an area from a side of the end to the opening.

4. The liquid ejection head according to claim 3, wherein in the ejection port forming member, the projection portion of the second recessed portion does not have the corresponding recessed portion.

5. The liquid ejection head according to claim 1, wherein the corresponding recessed portion accommodates a tip of the projection portion.

6. The liquid ejection head according to claim 1, wherein the recessed portion has a trapezoidal shape.

7. The liquid ejection head according to claim 1, wherein the ejection surface has a groove portion, and the ejection surface and the protection member are adhered to each other with an adhesive applied to the groove portion.

8. The liquid ejection head according to claim 7, wherein the groove portion is formed between the plurality of ejection port arrays.

9. The liquid ejection head according to claim 7, wherein the groove portion is formed to surround each of the plurality of ejection port arrays.

10. The liquid ejection head according to claim 9, wherein in one of the ejection port arrays arrayed at an end in a transverse direction of the print element substrate, a groove portion different from the groove portion is formed outside the groove portion formed to surround the ejection port array.

11. The liquid ejection head according to claim 7, wherein the groove portion is connected in a groove shape.

12. The liquid ejection head according to claim 1, wherein the protection member has an elastic modulus of 50 GPa or more.

13. The liquid ejection head according to claim 1, wherein the protection member is made of metal.

14. The liquid ejection head according to claim 13, wherein the protection member is made of stainless steel.

15. The liquid ejection head according to claim 1, wherein the ejection port forming member is provided with an identification number near the corresponding recessed portion.

16. The liquid ejection head according to claim 15, wherein the at least one recessed portion is formed so as not to overlap the identification number.

* * * * *